(12) United States Patent
Schutzman

(10) Patent No.: US 6,760,823 B1
(45) Date of Patent: Jul. 6, 2004

(54) FILE MAPPING SYSTEM AND RELATED TECHNIQUES

(75) Inventor: Neil F. Schutzman, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/411,500

(22) Filed: Apr. 10, 2003

Related U.S. Application Data

(62) Division of application No. 09/777,977, filed on Feb. 5, 2001, now Pat. No. 6,578,121.

(51) Int. Cl.7 ............................................... G06F 17/30
(52) U.S. Cl. ....................................... 711/162; 707/204
(58) Field of Search ........................... 707/204; 711/161, 711/162

(56) References Cited

U.S. PATENT DOCUMENTS

| | | |
|---|---|---|
| 5,822,780 A | 10/1998 | Schutzman |
| 6,047,294 A | 4/2000 | Deshayes et al. |
| 6,505,216 B1 | 1/2003 | Schutzman et al. |

*Primary Examiner*—Jack A. Lane
(74) *Attorney, Agent, or Firm*—Daly, Crowley & Mofford, LLP

(57) ABSTRACT

A system for efficiently representing or "mapping" data so that it can be rapidly communicated to a back-up storage system from a primary processor or a shared storage device while at the same time allowing a backup system to backup files rather than devices is described.

14 Claims, 23 Drawing Sheets

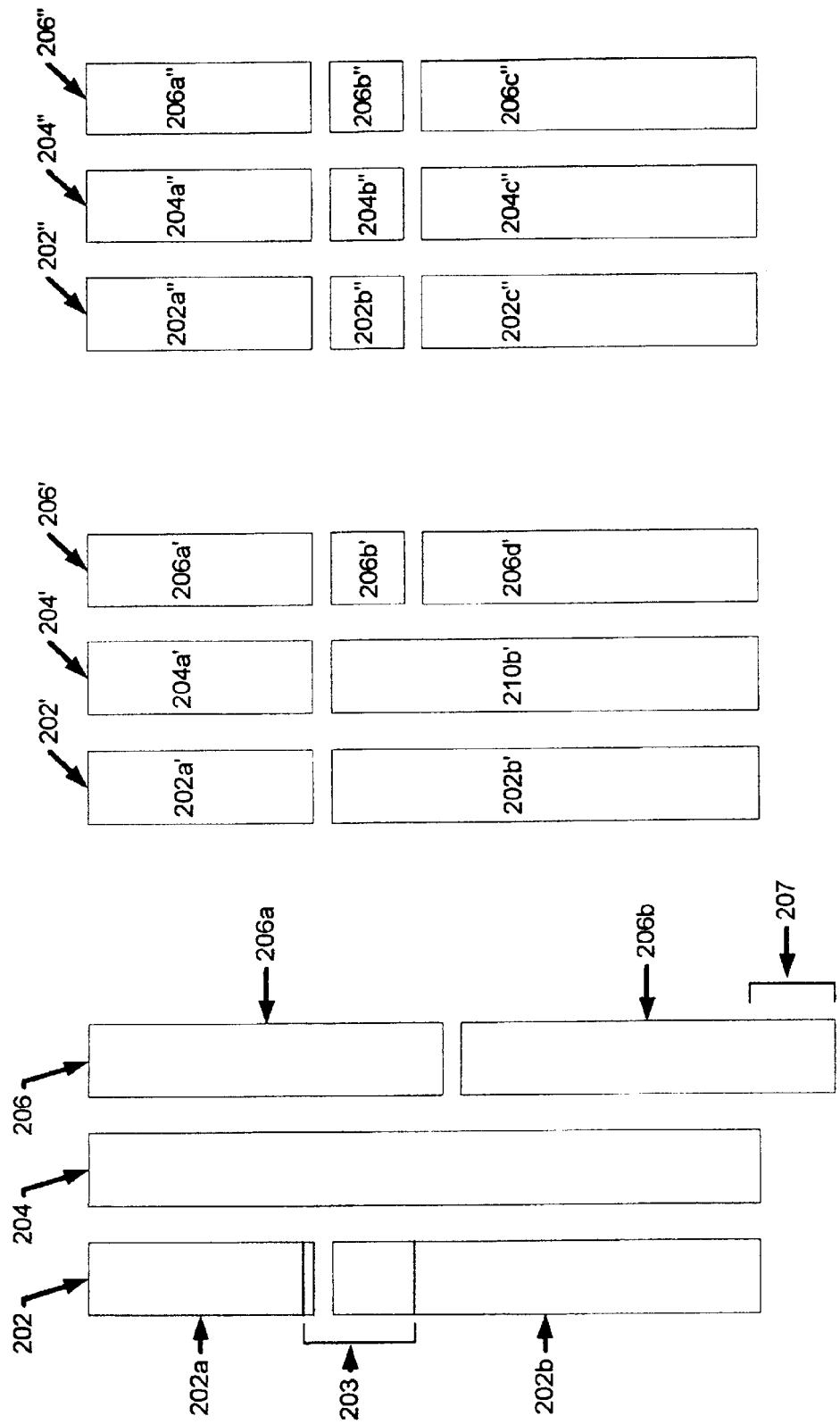

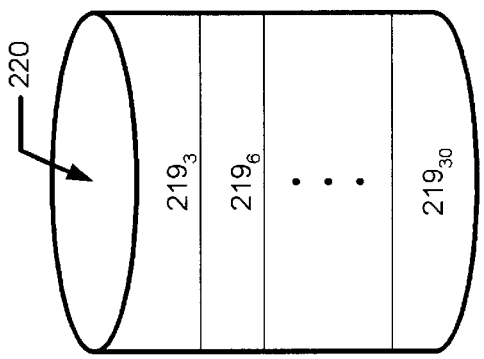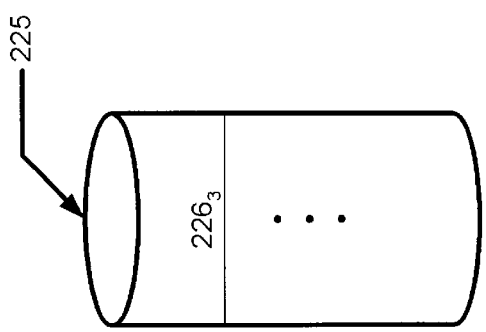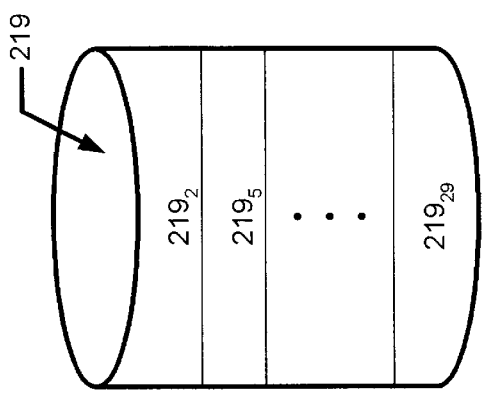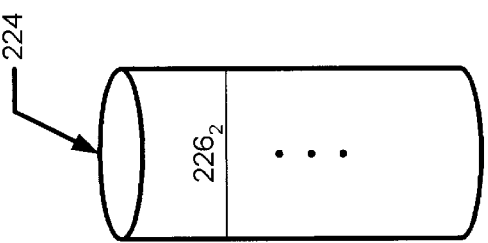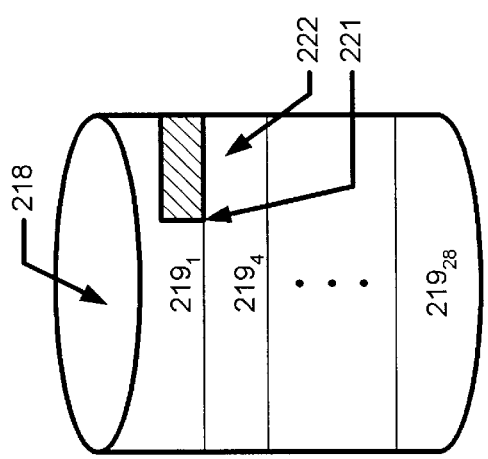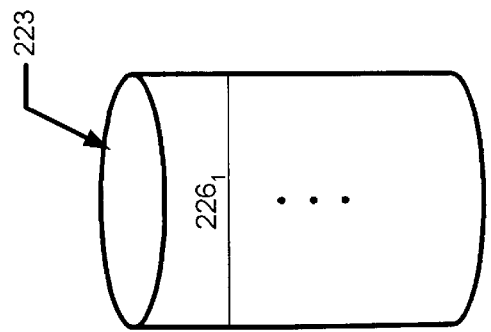
FIG. 14A
FIG. 14B

FILE MAPPING SYSTEM AND RELATED TECHNIQUES

CROSS REFERENCE TO RELATED APPLICATION

This application a divisional of and claims the benefit of application Ser. No. 09/777,977 filed Feb. 5, 2001 U.S. Pat. No. 6,578,121.

STATEMENTS REGARDING FEDERALLY SPONSORED RESEARCH

Not applicable.

FIELD OF THE INVENTION

This invention relates generally to backup storage systems and more particularly to a system and method for efficiently mapping information from a primary processing system to a backup storage system.

BACKGROUND OF THE INVENTION

As is known in the art, computer systems which process and store large amounts of data typically include a primary processor coupled to a shared storage system in which the data is stored. The primary processor performs its operations using the storage system. To minimize the chance of data loss, the computer systems also can include a backup storage system coupled to the primary processor and the storage system. Often the connection between the primary processor and the backup storage system is through a network in which case the primary processor is sometimes referred to as a "client processor" or more simply a "client."

The backup storage system can include a backup storage device (which may include disk drives, tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data—i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

This form of backing up data may be referred to as "logical-logical" backup. That is, the logical data is backed up on the backup storage device. The data to be backed up is presented independent of the manner in which it is physically stored on the shared storage system at the physical storage system level, independent of the file system level mechanisms on the client, and independent of how data is stored on the backup storage device.

Logical-logical backup can be a particularly convenient form of backup. The backup storage system, however, may need to be capable of interaction with a variety of different clients. For example, it may be desirable to have a backup storage system that can backup data from both a Solaris operating system and HP-UX operating system. By providing logical level data across the network to the backup storage system, the backup storage system can take that data and convert the data location as appropriate for storage in its own physical storage system (i.e., take the data at the application level and convert it to the file system level, logical volume manager and physical storage system, as each of those levels is possibly uniquely implemented in the backup storage system). Thus, if the client is running the HP-UX operating system and the backup storage system is using a Solaris operating system, the backup storage system can save and retrieve data according to the formats used in the Solaris operating system. If data were copied directly from the storage system to the backup storage system, the stored data would depend on the file system level formats for the client (here, HP-UX). The backup storage system would then be unable to read or examine that data because it uses different file system level formats (here, Solaris).

One problem with such a backup system, however, is that the backup process requires significant traffic on the network. Moreover, if the network medium is crowded with traffic or can not support high speed data transfer, the backup process can be slow. In addition, this architecture may require significant resources of the client or the storage system. The client and the storage system must fully parse the data from the physical storage level to the application level. Thus, this approach requires a relatively large amount of system resources and time to complete transfers. This is particularly true when there is a large amount of data to back up.

The EMC Data Manager (EDM) line of products is capable of logical-logical backup and restore over a network, as described in numerous publications available from EMC, including the EDM User Guide (Network) "Basic EDM Product Manual".

To overcome the above problems, a backup storage architecture in which a direct connection is established between the shared storage system and the backup storage system was conceived. Such a system is described in U.S. Pat. No. 6,047,294, assigned to assignee of the present invention, and entitled Logical Restore from a Physical Backup in Computer Storage System. In this approach, the backup storage system may be a system as generally described in EMC Data Manager: Symmetrix Connect User Guide, P/N 200-113-591, Rev. C, December 1997, available from EMC Corporation of Hopkinton, Mass. The direct connection between the shared storage system and the backup storage system may be provided as a high speed data channel, such as a SCSI cable or one or more fiber-channel cables. In this system, a user may be permitted to backup data over the network or the direct connection.

When the shared storage system is a Symmetrix product, the direct connection may be connected from the backup storage system to the storage system through a host adaptor. For high speed data transfer using the direct connection approach, data may be copied directly from physical storage devices to the backup storage system.

The shared storage system can be provided from a plurality of different physical storage devices. Each of the respective physical devices can include contiguous segments of storage which must be backed up. These contiguous segments of storage may, but need not, be of the same size. The segments of storage are sometimes referred to as "hyper-volumes." Thus, hyper volumes correspond to segments of physical storage that can be used as components when constructing a virtual volume for use by the file system With respect to a back-up scenario, however, the task remains of determining which hyper-volumes (or portions of hyper-volumes) should be backed up and communicating this information to the backup storage device. For example, consider backup for data base files in an Oracle data base application (such as Oracle versions 7.2.x, 7.3.x and 8.0.4, available from Oracle Corp. of Redwood, Calif.). Files may be stored on any one, or across any number, of hyper-volumes located in any particular set of locations across one or more physical storage devices.

To provide an approach which allows mapping of individual files, a technique was conceived in which a structure representing each contiguous piece of disk storage was passed between the client and the backup storage system. Thus, in the prior art approach to backing up data, each 128 kilobytes (KB) of storage memory in the shared storage system is represented by a block of memory (or more simply "a block"), a beginning offset value and a length. The beginning offset value and length define a so-called extent.

In any particular system, each block is typically of the same predetermined size. Different systems, however, can utilize different size blocks. The particular size of a block used in any particular system is selected in accordance with the requirements and capabilities of that system. In one system, for example, it may be preferable to utilize a block size of one-hundred bytes while in a different system, it may be it may be preferable to utilize a block size of two-hundred bytes. One problem with this approach is that as the amount of data to be backed-up grows in size, there is a concomitant increase in the size of the mapping information. Thus, the size of the mapping information can itself grow to a size which makes it difficult to deal with.

For example, assuming 64 gigabytes (GB) of data in a striped file system must be backed-up and that a single 100 byte (B) block of memory represents (or "maps") each 128 kilobytes (KB) of disk space memory. Then the amount of memory needed to represent the 64 GB of memory can be computed as (64 GB/128 KB)*100 B or 50 megabytes (MB). Thus, 50 MB of data is required to represent the data to be backed-up and this 50 MB of data must be transferred from the client to the back-up storage system.

Part of the reason so much memory is needed to represent the data to be backed-up is due to the properties of a striped file system. In particular, one property of a striped file system is that the data is logically distributed across a number of disk hyper-volumes. Thus, striped file systems tend to not have large contiguous physical segments of memory. Rather there are a relatively large number of smaller memory segments over which the data to be backed up is distributed. Since the prior art approach utilizes a single block to represent each contiguous memory segment, regardless of the size of the contiguous memory segment, a relatively large amount of memory is required to represent data stored in a striped file system.

Thus, one problem with the conventional approach is that it is expensive in terms of memory (i.e. a relatively large amount of data is needed for the file mapping). Furthermore, the prior art approach does not scale well since an increase in the amount of data to back-up results in a concomitant increase in the amount of data required to map the file. Moreover, the prior art "one block per extent" approach results in a relatively large amount of processing resources required to communicate the file mapping data between the client and the back-up storage device. Further still, since the filing mapping data is relatively large, a relatively large amount of time is required to transmit the data from the client to the back-up storage system.

It would, therefore, be desirable to provide a technique for efficiently representing or "mapping" data so that it can be rapidly communicated between a primary processor and a back-up storage system while at the same time allowing a backup system to backup files rather than devices.

SUMMARY OF THE INVENTION

In accordance with the present invention, a technique for representing files in a striped file system comprises generating one or more extent blocks each of which defines a logical volume, an offset value and a length and generating a repetition block which defines a number of extent blocks and a number of repetitions. With this particular arrangement, a technique for efficiently representing data so that it can be communicated from a client to a back-up storage system is provided. The extent and repetition blocks define storage segments in which data to be backed-up is stored. By utilizing extent and repetition blocks to represent the storage segments requiring backup, a compact representation is provided. Since the storage segments to be back-up are represented compactly, a relatively small amount of data is needed for the file mapping. Also, this approach scales well since increasing the amount of data to be backed-up does not necessarily result in a concomitant increase in the amount of data needed for the file mapping. Furthermore, since the data needed for the file mapping is compact, fewer processing resources are required to communicate the file mapping data between the client and the back-up storage device. Further still, since the file mapping data is compact, a relatively small amount of time is required to transmit the data from the client to the back-up storage system. To perform the backup file mapping, it is first necessary to obtain a physical device mapping and a logical file mapping. Using these two inputs, it is then possible to perform the backup file mapping.

A method of backing up data in a system comprising a primary processor, a shared storage device and a backup storage device comprises, performing a discovery process which includes the step of identifying files that are required to be backed up and determining a file type for each of the identified files. In response to a file corresponding to one of a physical, concatenated or striped file type, a corresponding one of physical, concatenated or striped storage processing is performed with each of the processes utilizing an extent block representation. With this particular arrangement a technique which facilitate the mapping of a logical object to hypervolumes and extents is provided The technique provides the mapping by obtaining the logical/physical volume information through logical volumes or for physical devices, as appropriate, and then obtaining the logical file information. Given this data, the mapping system can construct its own mappings between the logical file extents and the LVM mappings to hypervolumes. By first determining the storage and logical information for the object which is going to be mapped and determining the type of object for which extent information is being found, an appropriate process dependent upon the file type can be used to generate extent and, if needed, repetition blocks. This results in a backup technique which does not require a lot of memory since a compact representation of the data to be backed up is used. Also, this results in a backup technique which is relatively rapid compared with prior art approaches.

BRIEF DESCRIPTION OF THE DRAWINGS

The foregoing features of this invention, as well as the invention itself, may be more fully understood from the following description of the drawings in which:

FIG. 13A–13C are a series of block diagrams illustrating a process for normalizing a disk;

FIGS. 14A and 14B are a series of block diagrams illustrating the map beginning process of FIG. 14;

DETAILED DESCRIPTION OF THE INVENTION

Before describing the file mapping system of the present invention, and the techniques associated therewith, some introductory concepts and terminology are explained.

The term "file system extent" or more simply "file extent" or "extent" refers to a portion of a file as viewed by a file system. As viewed by a file system, each file extent is stored in a contiguous space. As will be described in detail hereinbelow, each of the file extents is mapped separately.

The term "segment" is used to describe a portion of memory as viewed by a logical volume manager (LVM). There is not necessarily any fixed correspondence between extents and segments although in some particular applications there may be a correspondence between extents and segments.

Reference is sometimes made herein to particular storage systems such as the Symmetrix system available from EMC Corporation of Hopkinton, Mass. It should be understood that the concepts and techniques described herein apply to a plurality of different storage systems.

Reference is also sometimes made herein to systems having a certain number of columns (e.g. three columns) with each of the columns having a particular length (e.g. 100) and a particular stripe width (e.g. 128K). It should be understood that any particular values mentioned herein are only exemplary and are not intended in any way to limit the scope of the invention. It should also be understood that the present invention applies to systems having any number of columns, any column length and any column stripe width. The particular number of columns, column length and column stripe width (as well as other system parameters) in any particular application are chosen in accordance with a variety of factors particular to each application. For example, some applications may have fewer or more than three columns, may have column lengths greater than or less than 100 and may have stripe widths greater or lesser than 128K.

In general overview, the present invention relates to a system and techniques which provide the mapping of a logical object to hypervolumes and extents. The system provides the mapping by obtaining the logical/physical volume information through logical volumes or for physical devices, as appropriate, and then obtaining the logical file information. Given this data, the mapping system can construct its own mappings between the logical file extents and the LVM mappings to hypervolumes.

The file mapping process of the present invention proceeds as follows. First, the storage and logical information for the object which is going to be mapped is determined. To get this information, it is necessary to determine the type of object for which extent information is being found. In a Symmetrix system, this can be done by calling SymDataFileIdentify.

Figure 11:
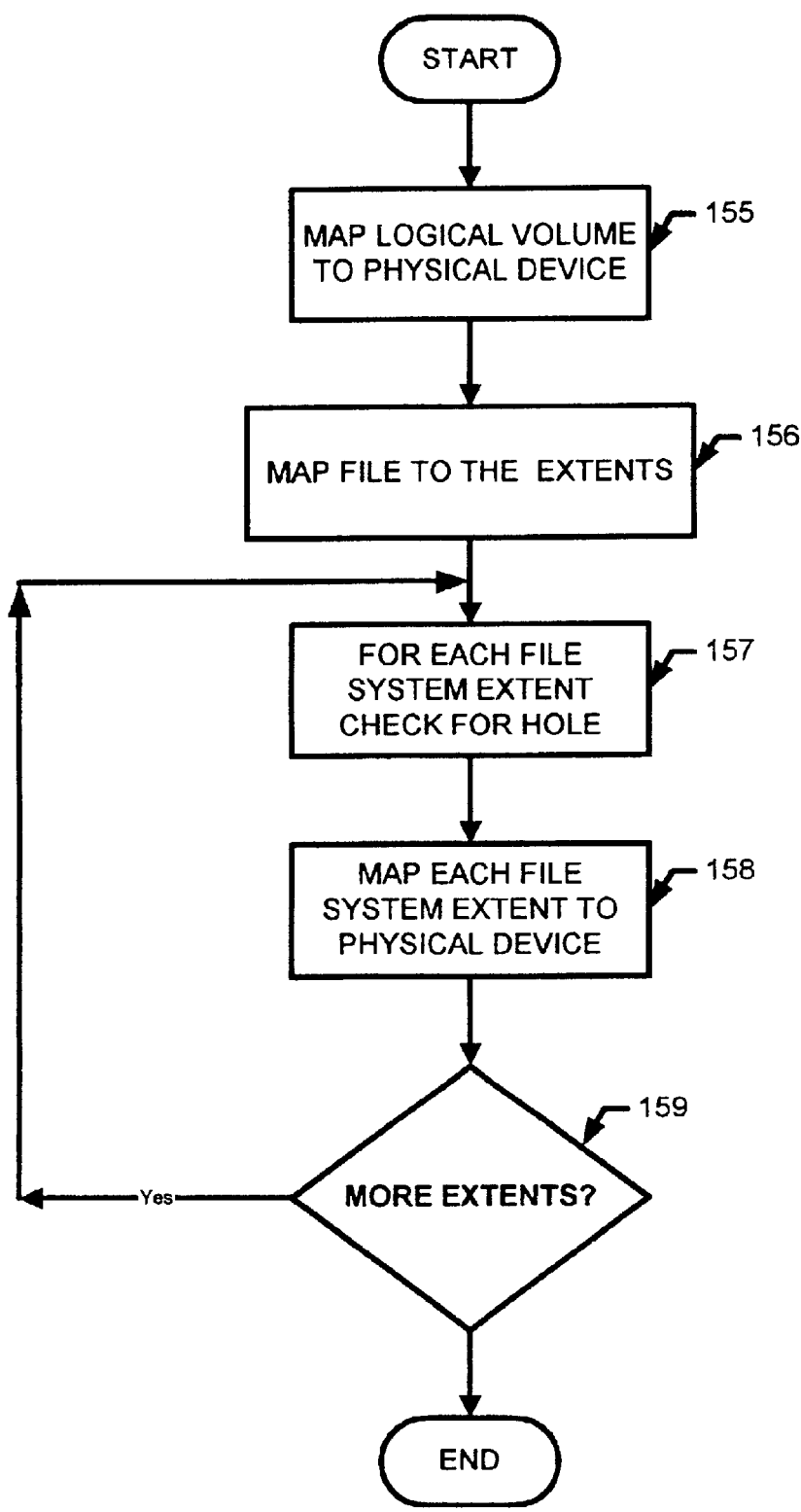
FIG. 11 is a flow diagram which illustrating a method for mapping a file stored on a physical device.

If the object is a physical device there is no logical information and the physical information is obtained. In a Symmetrix system this can be done via a call to SymDataObjectResolve. If it is thus determined that the object being mapped is a physical device then, as will be described in detail below in conjunction with FIG. 11, there is only one object for which to generate an extent block. Thus the extent block is generated and processing is complete as shown in FIG. 11.

As will be discussed in conjunction with FIG. 11, if the file is on a physical device, then a loop of the file extent blocks is performed. For each extent block, a file mapping extent block of the present invention is generated. The device is the physical device and the offset and length are the same as the files.

If the object returned is a file then, in a Symmetrix system, the logical information is obtained via a SymFileShow call. If the object was a file system, then the logical information is obtained via a SymFilesystemShow call. It is then necessary to determine if this file is an LVM or a physical device. In a Symmetrix system, this determination can be made using a SymDataFileIdentify call on the device name the file or file system lives on. The physical information can then be obtained by calling the appropriate routine (e.g. a SymMapLvShow call if an LVM and a SymDataObjectResolve call if a physical device).

If the object returned is a file system, a determination is made of how the object is stored. In a Symmetrix system, this can be done via a call to SymFileSystemGet. This call returns the mount point information of the file. It is then possible to walk the mount point list to find the mount point for this file system. Then a SymdataFileIdentify call with the device the file system is mounted on is made (filesystem_dev) to determine if the file system is mounted on an LVM or a physical device. Then extent mapping is done for the physical device or the LVM, respectively (in accordance with the techniques discussed in conjunction with FIGS. 11–13).

If the object is an LVM then, in a Symmetrix system, the logical information can be obtained using a SymMapLvShow call. In the call, the mapping information is requested to be returned in a compressed format. This means that striped data will be returned as columns rather than in data logical order.

If it is determined that the object being mapped is an LVM, a check is performed to determine if the LVM is concatenated, simple or striped. As will be described in detail below in conjunction with FIG. 12, if the LVM is concatenated or simple an extent block is generated for each subdisk that is part of the LVM.

If the LVM is striped, it is desirable to generate repeating blocks for the LVM. This process is described in below in conjunction with FIG. 13. To generate repeat blocks, first the subdisks that make up the columns of the LVM are normalized (see FIGS. 13A–13C). The normalization process gives each column a set of equally sized subdisks. For each set of subdisks, the size of the subdisk is divided by a p_mirror_info→stripe_size and this result indicates the number of contiguous segments. This resultant size is then divide by p_mirror_info→num_stripe_columns. The result of this operation is a value which corresponds to the number of times the stripe column repeats. A repeat block is then generated for the number of repeats and an extent block is generated for each column. The first entry for each column is relative to the location of the first segment.

Consider one example of an LVM. In this exemplary LVM, there are 3 columns. The first column (designated column 0) is made up of 3 subdisks. The second column (designated column 1) is made up of 1 subdisk and the third column (designated column 2) is made up of 2 subdisks. Data in an LVM is stored in lvm segments. Each lvm segment is the size of a column width. For data logical order the lvm segments are read from column 0, column 1 and then column 2.

LVM segments may span subdisks, and files may begin in the middle of a segment. In this example, assume the file starts in the middle of an LVM segment, continues for two full segments and ends by covering a partial segment.

Figure 12:
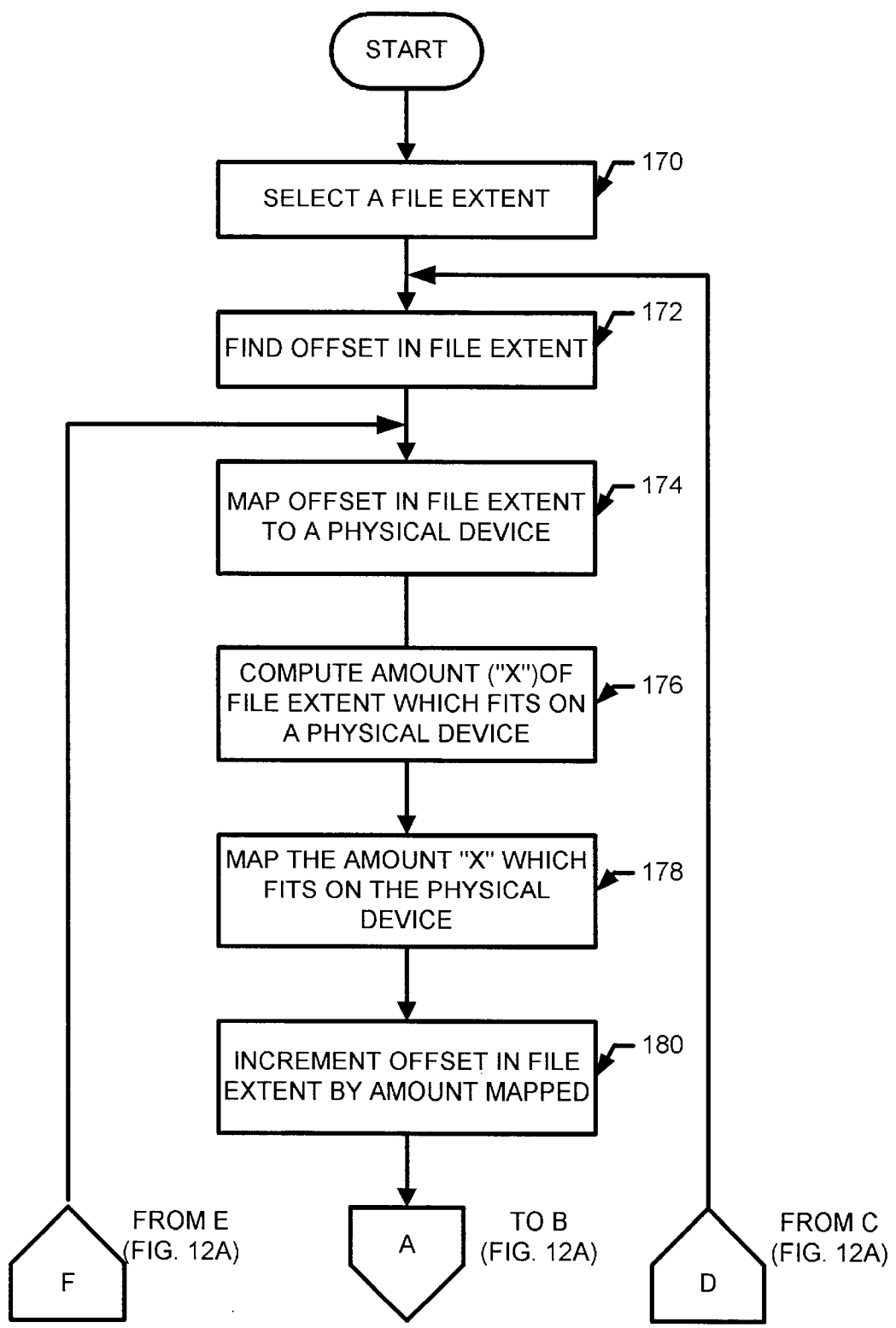
FIGS. 12 and 12A are a series of flow diagrams illustrating a method for mapping a file on a concatenated logical volume.
Figure 12A:
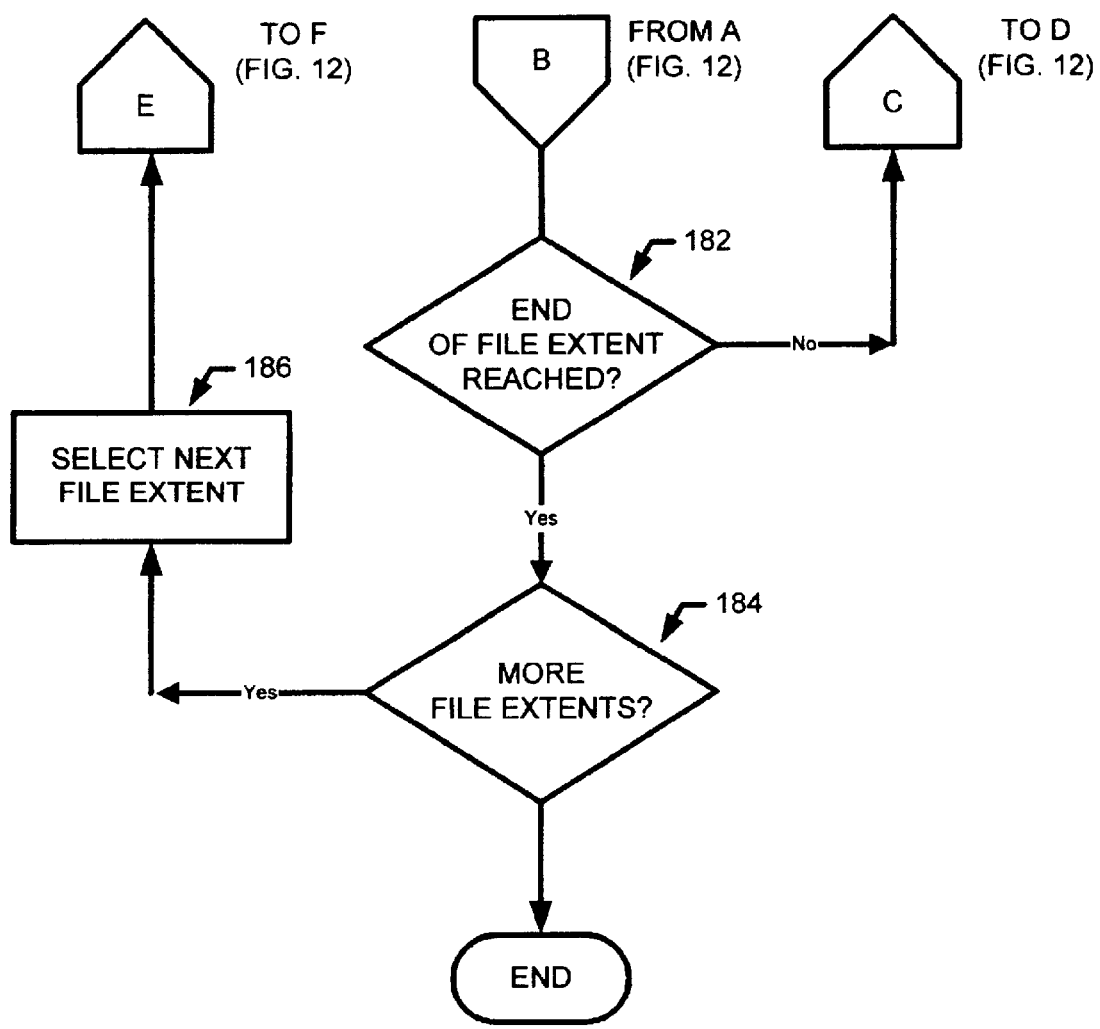

If the LVM is concatenated, map the file offset to the corresponding offset on the LVM and build an extent block for it (see FIG. 12).

If the LVM is striped, normalize the subdisks that make up the columns of the LVM (see FIGS. 13A–13C) to provide each column having a set of equally sized subdisks. Then a loop of the file extent blocks is performed. For each file extent, map the initial portion of the file until an LVM segment boundary is reached in accordance with a map beginning process described in conjunction with FIG. 14. If the file extent block is large enough for a repetition (extent block size>=number of stripes*stripe width) then the file is processed in accordance with a map repeating process described in conjunction with FIG. 15. If the remaining portion is not big enough for a repeat, then the file extent block is processed in accordance with a map ending process described below in conjunction with FIG. 16.

Figure 1:
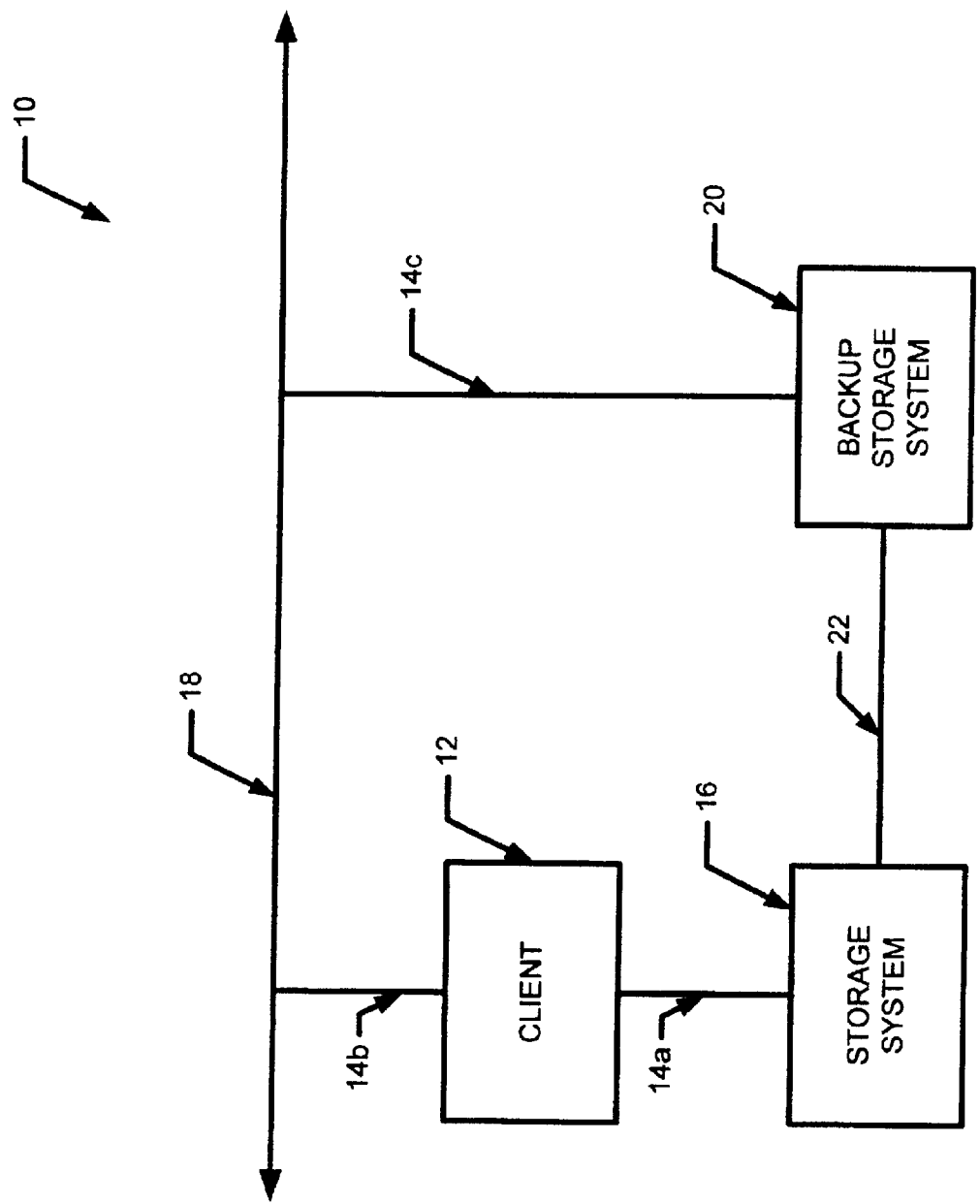
FIG. 1 is a block diagram of a backup storage system that includes a mechanism for direct backup of data on a shared storage system.

Referring now to FIG. 1, a processing system 10 includes a computer or client 12 coupled via a path 14a to a storage system 16. Client 12 performs its operations using data stored in storage system 16. The client 12 is also coupled via a path 14b to a network or network bus 18.

The client 12 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system such as the WINDOWS NT operating system. The storage system 16 may be any conventional storage system, including a Symmetrix storage system, as described above. The client 12 may be connected to many other devices over the network 18.

A backup storage system 20 is also coupled to the network 18 via path 14c. The backup storage system 20 includes a backup storage device (which may be disk drives, tape storage or any other storage mechanism), together with a system for placing data into the storage and recovering the data from that storage. The backup storage system 20 is also coupled to the storage system 16 via a path 22. Thus, in this system, a direct connection 22 is established between the storage system 16 and the backup storage system 20.

The physical storage devices which comprise storage system 16 and back-up storage system 20 of FIG. 1 may be provided as disk drives. A disk drive may include one or more disks of a recording media (such as a magnetic recording medium or an optical recording medium). Information can be written and read from this storage medium for storage purposes. The physical storage devices for use with the present invention may, however, be any other storage mechanism.

In a system including an array of physical disk devices, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed, February, 1996). These systems include "RAID" storage systems. RAID stands for Redundant Array of Independent Disks.

In the system shown in FIG. 1, the backup storage system may be a system as generally described in EMC Data Manager: Symmetrix Connect User Guide, P/N 200-113-591, Rev. C, December 1997, available from EMC Corporation of Hopkinton, Mass. The direct connection 22 may be a high speed data channel, such as a SCSI cable or one or more fiber-channel cables. In this system, a user may be permitted to backup data over the network 18, or the direct connection 22.

For high speed data transfer using the direct connection 22 of FIG. 1, data may be copied directly from physical storage devices to the backup storage system 20. The task remains, however, of determining which hyper-volumes (or portions of hyper-volumes) should be backed up and how to represent the data.

In general overview, client 12 and/or storage system 16 determine which hyper-volumes (or portions of hyper-volumes) should be backed up and represents the data utilizing so-called extent blocks and/or repetition blocks. The client 12 utilizes the extent and repetition blocks by first determining the storage characteristics of the data and then selecting an appropriate extent/repetition block combination to use based upon the data storage characteristics. The details of the particular type of representation to use in any particular embodiment are provided below in conjunction with FIGS. 2–17A.

Referring now to 2, layers of software used by a backup application 24 in a computer system to represent or "map" information to be backed up is shown. In this diagram, a notation is used in which layers which are exposed to other layers can communicate directly with each other. For example, the back up application layer 24 is exposed only to a mapping layer 25 and thus communicates only with that layer. The mapping layer, on the other hand is exposed to the application layer 24, a file system layer 26, a logical volume manager (LVM) layer 28 and a physical disk layer 30.

At the top level 24, the backup application may assume that data is stored in a manner that has very little to do with how the data is placed onto the physical device. For example, the application may view the storage system as containing a number of directories and data files within the directories. Thus, in an application written for use in the Unix operating system, the application will assume that files are stored according to the Unix directory structure (including hierarchical directories and files located within the directories). This assumed organization of physical storage may have very little to do with how that data is actually stored onto the actual storage devices. This view may be referred to as the "logical view" because the separation between the logical view of data from the application level is divorced from any view of how the data is physically stored.

The application level 24 interfaces with the mapping layer 25. The mapping layer 25 interfaces with the file system layer 26, the logical volume manager (LVM) layer 28 and the physical disk layer 30 and performs a mapping function between the file system layer 26, the LVM layer 28 and the physical layer 30. The file system layer 26 is concerned with how files are stored on disks and how to-make everything work efficiently and reliably. Thus, the file system level may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

Relatively early in the development of computer systems, disk drives became a fundamental device for storage. Accordingly, computer operating systems have been developed assuming that memory will rely on input/output ("I/O") to a disk drive. The file system 26, therefore, may assume one or more "volumes" which correspond to a physical storage unit such as a disk drive (or any other unit of storage), with data stored in blocks on the disk drive.

Continued increase in demand for storage to be available for use by applications has continuously increases. As a result, a number of separate physical devices may be required to accommodate the total amount of storage required for a system. In addition, storage systems are often changed or reconfigured.

To insulate the operating system from any changes within the physical device storage system, some mechanism is often employed to flexibly map a standard (volume) view of physical storage onto an actual physical storage system. The LVM 28 helps achieve this function by mapping the file system view of data storage into an intermediate layer.

Finally, the actual storage reading and writing (and, potentially, mapping onto physical storage devices) occurs within the physical storage system layer 30. Thus, for example, the logical volume manager may map the file system level view of data into volume sizes corresponding to fixed physical storage segment sizes for storage on a physical device (e.g., block sizes). The physical storage system level may then map the logical volume manager level volumes onto physical storage segments (e.g., hyper-volumes discussed below).

LVMs, such as those provided by VERITAS, have been implemented for use with the HP-UX and Windows NT operating system, for example. The Symmetrix line of storage systems, available from EMC Corporation, of Hopkinton, Mass., is one system capable of mapping hyper-volumes onto physical devices (the Symmetrix product line of integrated cached disk arrays is described in numerous publications form EMC Corporation, including the Symmetrix model 55xx product manual, p-n200-810-550, rev. february, 1996.).

Figure 3:
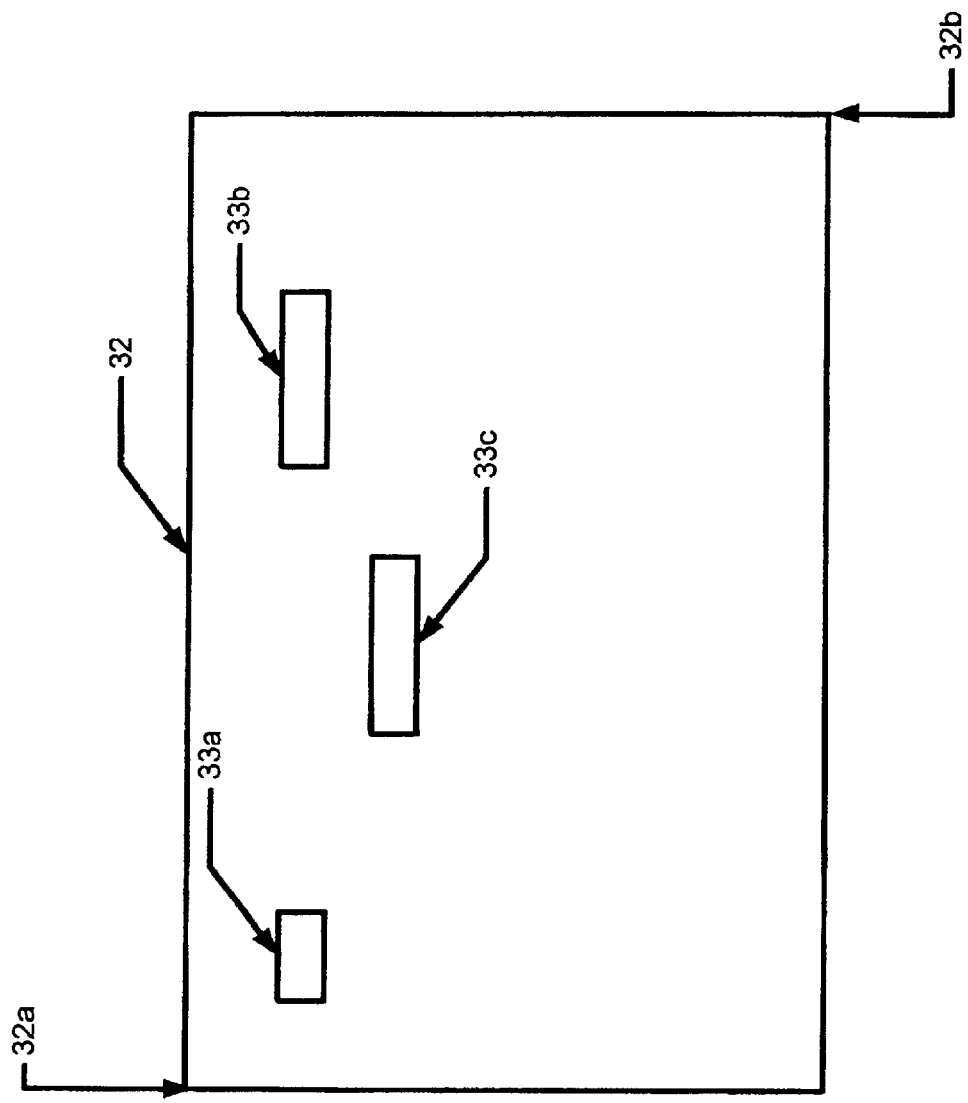
FIG. 3 is a file system view of data in a file.

Referring now to FIG. 3 a file system view of data is shown. Generally, the file system level is concerned with how files are stored on disks and how to make everything work efficiently and reliably. Thus, the file system level of a computer system may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

As shown in FIG. 3, the file system views storage as a single large contiguous piece of storage 32 and the file system views each file being stored in the single contiguous piece of storage. FIG. 3 shows a file 33 made up of portions 33a–33c (referred to as file extents) which are stored in the storage 32. The file system views file 33 as being stored in one contiguous segment of memory within storage 32. The file system thus views the storage as some "pane" of storage space 32 (i.e. it views itself as a flat space) having a beginning offset 32a of zero and an ending offset 32b of some number corresponding to the size of the space.

It should be appreciated that if the file 33 is stored on an LVM, each of the file extents 33a–33c can be made up of one or more stripes with each stripe being on a different physical device. That is, even though the file system view the storage space 32 as "flat," the logical volume manager can view the file as being striped across different storage devices.

Figure 4:
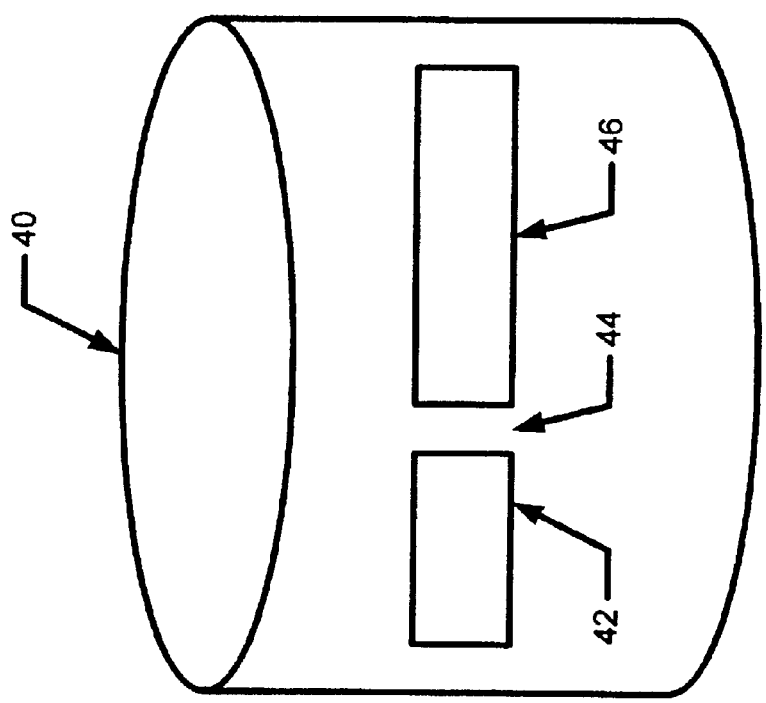
FIG. 4. shows the logical volume manager view of two extents.

Referring now to FIG. 4, a logical volume manager (LVM) represents data as a pair of extents 42, 46 having a space or gap 44 there between and stored on a single logical volume 40.

Figure 5:
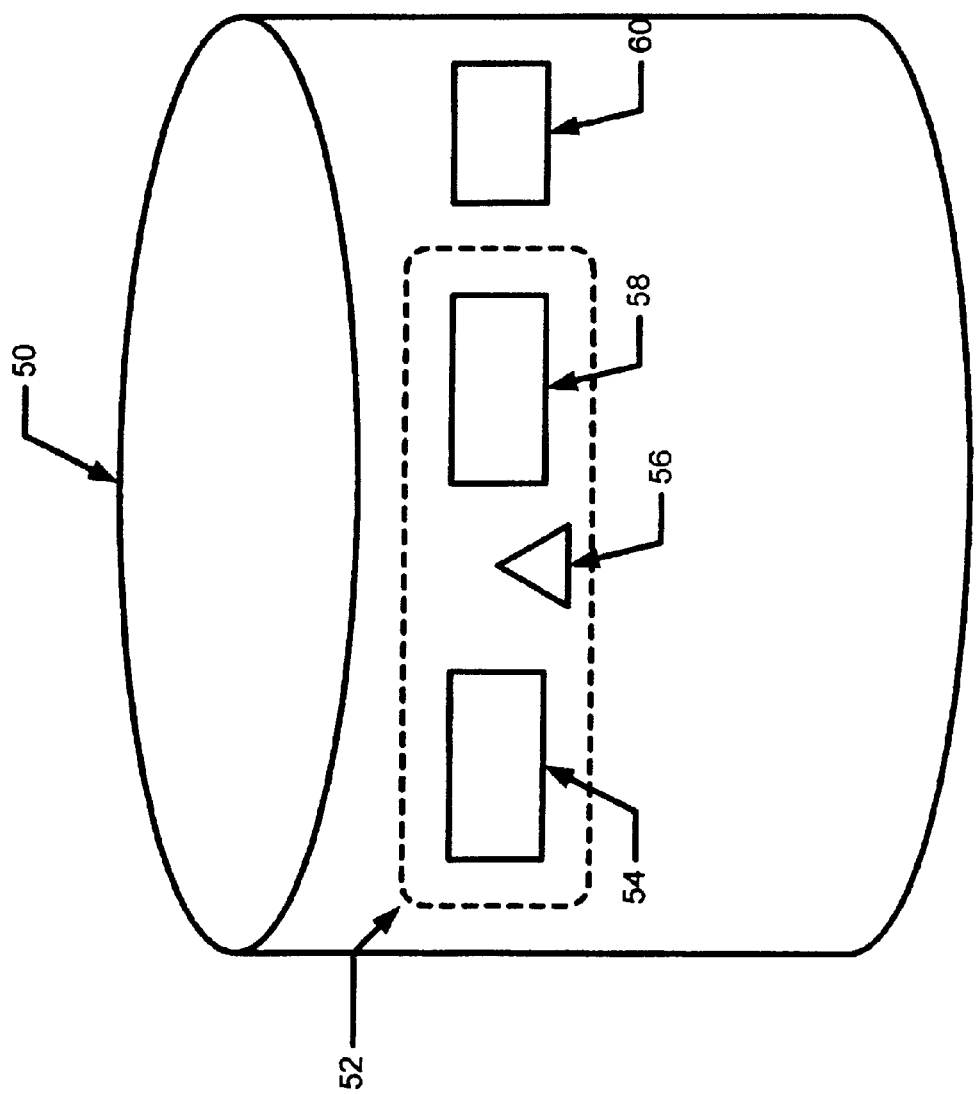
FIG. 5. is a file system view of a hole.

Referring now to FIG. 5, a physical device having a file 52 stored thereon is shown. The file 52 includes a first data segment 54 and a second data segment 58 separated by a hole 56. The process used to map the data segments 54, 58 will be explained below.

In FIG. 5, assume the file 52 is one megabyte (MB) and also assume that the only data is one-hundred bytes at the beginning of the file 52 and one-hundred bytes of data at the ends of the file 52. Thus, there is a gap or hole 56 of 999,800 bytes between the two sections of data 54, 58. The manner in which physical files are processed is discussed below in conjunction with FIG. 11.

Figure 6:
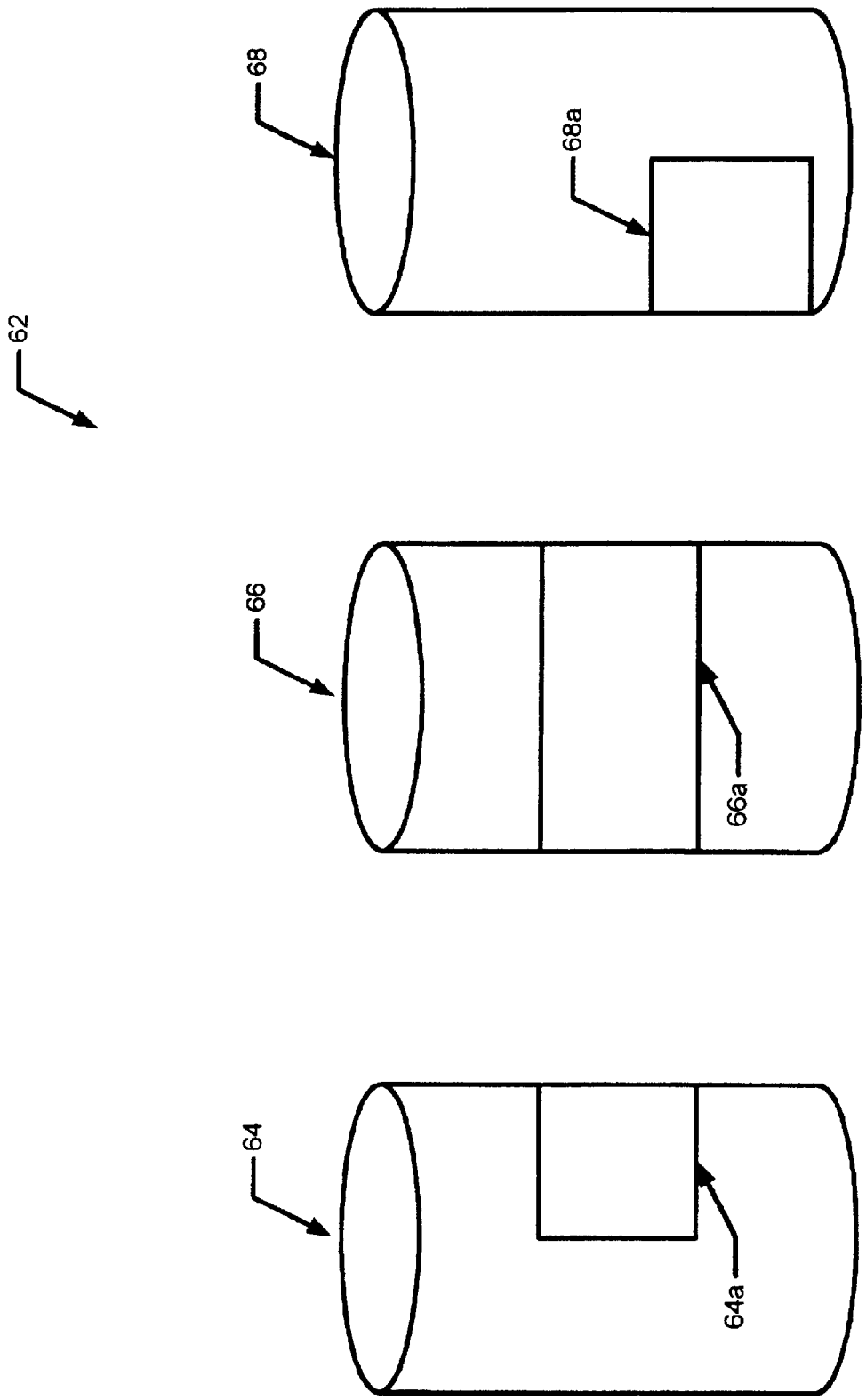
FIG. 6. is a file system view of a concatenated system.

Referring now to FIG. 6, a concatenated volume uses one or more sections of disk space. On a fragmented disk, this allows one to put together a volume larger than any individual section of free space available. It's a layout style characterized by sub-disks that are sequentially and contiguously arranged within the plex (or mirror) address space.

In FIG. 6, the concatenated volume uses a first section 64a on a first disk 64, a second section 66a on a second disk 66 and a first section 68a on a third disk 68. Thus in this case the concatenated file is provided is from three sections 64a–68a of three different disks 64–68. The manner in files stored on concatenated volumes are processed is discussed below in conjunction with FIG. 12.

Figure 7:
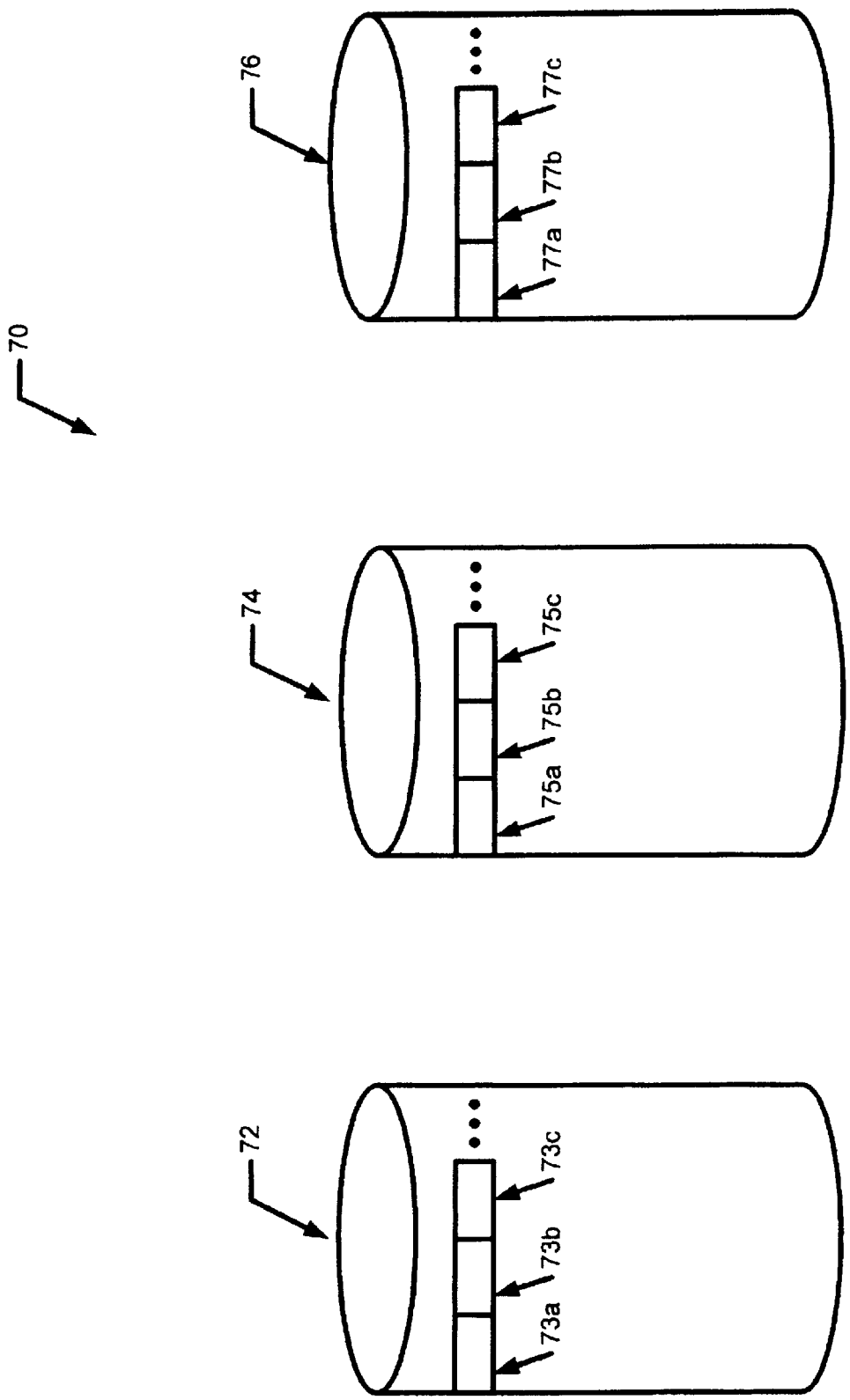
FIG. 7. is a file system view of a striped volume.

Referring now to FIG. 7, a three way striped volume includes three logical volumes 72–76. Each of the volumes may be on different physical devices but this need not be so. A striped volume corresponds to equally sized areas that are allocated alternately on the columns 72–76 of each striped plex (a plex is a duplicate copy of a volume and the data therein). There can be several plexes per volume. Each plex is one copy of the volume with which it is associated. The term plex and mirror are sometimes used synonymously. In an array, this is a set of logically contiguous blocks that exist in each disk before allocations are made from the next disk in the array. Striping is a layout technique that spreads data across several physical disks using stripes. The data is allocated alternately to the stripe columns within a plex.

As shown in FIG. 7, data is stored in blocks on each of the physical devices using a stripe technique. Thus, a first portion of the file is stored in block 73a, a second portion of the file is stored in block 75a, a third portion of the file is stored in block 77a, etc . . . This "stripe" pattern is repeated until the entire file is stored on the disks. The manner in which files stored on striped volumes are processed is discussed below in conjunction with FIG. 13.

Figure 8:
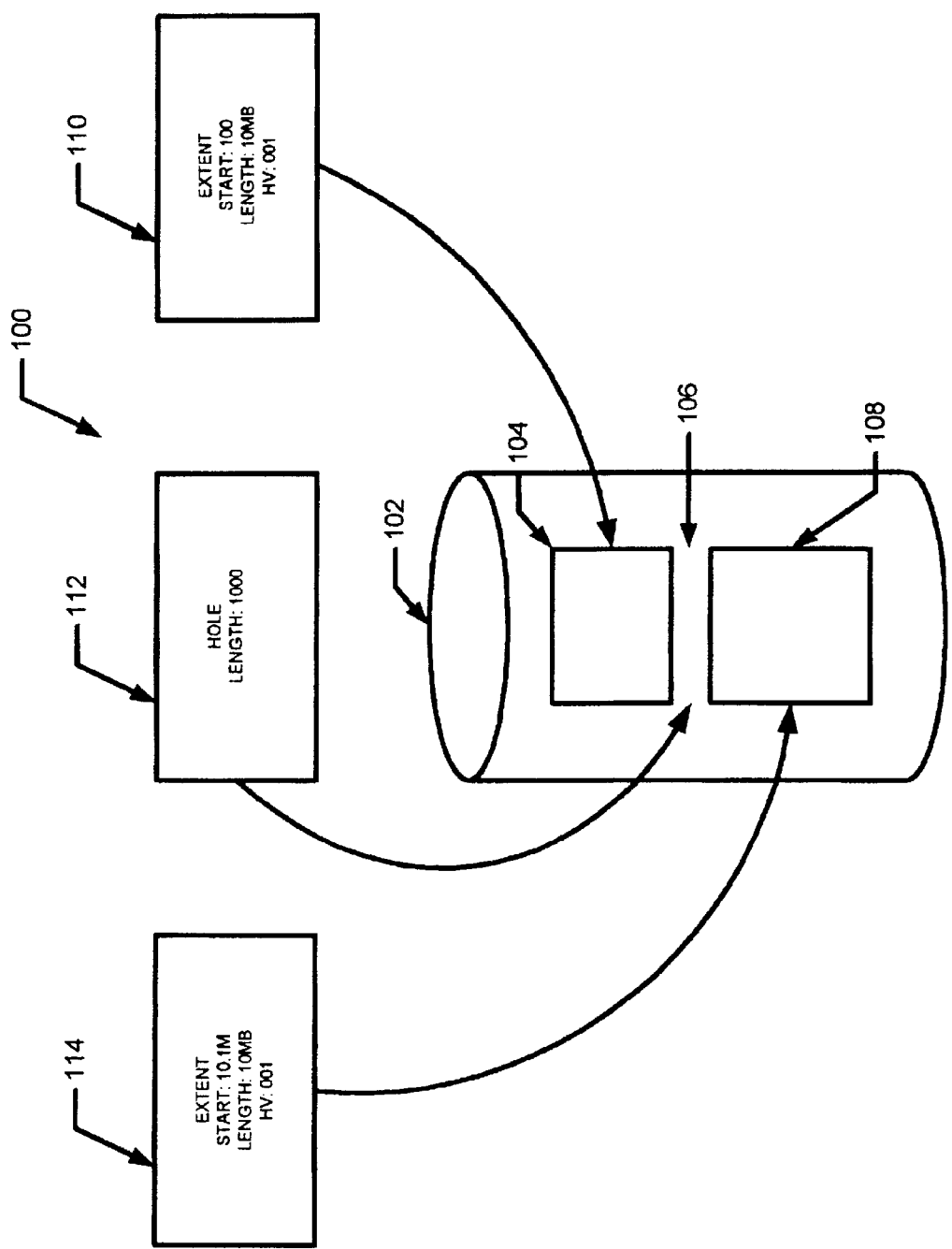
FIG. 8 is a diagrammatical view of how extent information is represented in a striped system.

Referring now to FIG. 8 a disk 102 has a first extent 104 having a start of 100, a length of 10 mega bytes (Mb) and a hyper volume designation of 001. After the extent 104 ends, the disk has a hole 106 having a length of 1000 Mb after which starts another extent 108 having a start of 10 million one hundred a length of 10 Mb and a hyper volume designation of 001. Thus, the disk 102 can be considered as having a relatively large piece of contiguous storage with a hole 106 in the center. In accordance with the present invention, the extent is mapped as shown in extent blocks 110, 112, 114. In particular, the extent 104 is mapped by extent block 110, extent 108 is mapped by extent block 114 and the hole is mapped by the block 112. Thus the entire file is mapped with the blocks 110, 112, 114.

Figure 9:
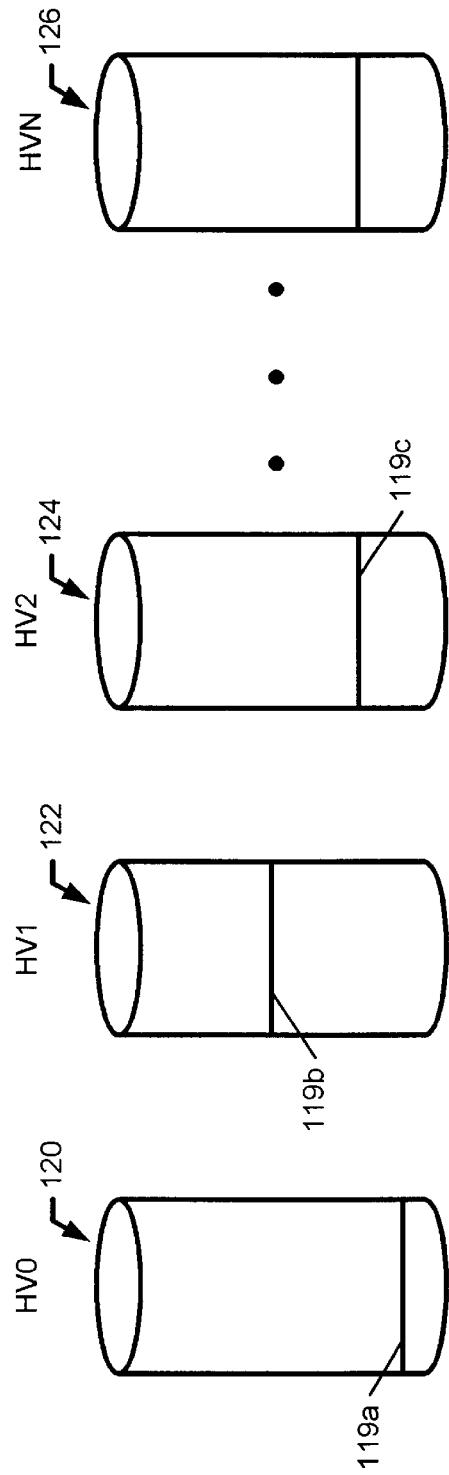
FIGS. 9 and 9A are a series of figures which show how extent and repeat blocks are used to represent data.
Figure 9A:
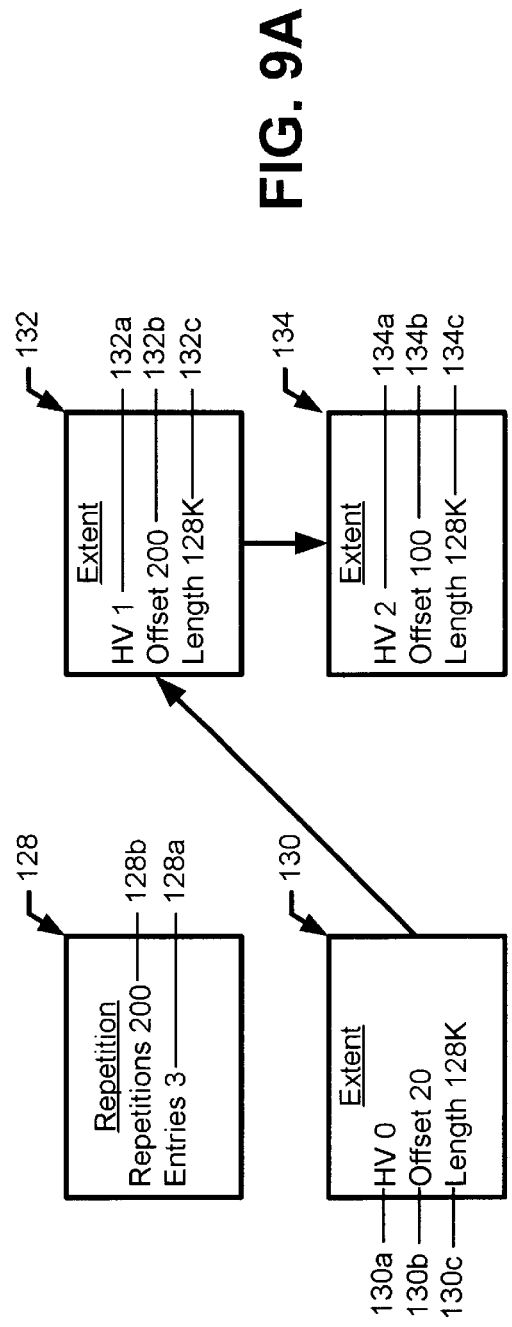

Referring now to FIGS. 9 and 9A, an example is provided illustrating how the extent information block represents extent information block for a striped LVM. This example uses a striped set over three volumes, where the stripe width is 128K.

In this example there are three stripes 119a–119c. The first stripe 119a starts at an offset of 20 into hyper-volume 0 (HV 0) 120, the second stripe starts at an offset of 200 into hyper-volume 1 (HV 1) 122 and the third stripe 119c starts at an offset of 100 into hyper-volume 2 (HV 2) 124. Each stripe 119a–119c has been written 200 times. Thus, in this example there are a total of 600 stripes with each stripe being 128K in size.

The blocks to represent this file would look like those shown in FIG. 9A. This stripe set is represented by a repetition block 128 and three extent information blocks 130–134. The repetition block 128 has two entries 128a, 128b. Repetition block entry 128a specifies that the repetition is three entries long (i.e. there are three extent blocks) and repetition block entry 128b specifies that the three extent blocks identified by entry 128a go on for 200 repetitions.

The first extent block 130 has three entries 130a–130c which describe the first extent as being on HyperVolume 0 and starting at offset 20 for a length of 128K. The second extent block 132 has three entries 130a–130c which describe the second extent as being on HyperVolume 1 and staring at offset 200 for a length of 128K. The third extent block 132 has three entries 132a–132c which describe the third extent as being on HyperVolume 2 and starting at offset 100 for a length of 128K To compute the fourth through size hundredth extents one would simply repeat looking at these blocks and re-computing the offsets.

FIGS. 10–11, 12–13 and 14–17 are a series of flow diagrams showing the processing performed by portions of system 10 (e.g. FIG. 1) to compactly represent data to be backed up so that the information can be transferred from the client (e.g. client 12 in FIG. 1) to a backup storage system (e.g. backup storage system 20 in FIG. 1). The rectangular elements (typified by element 136 in FIG. 10), herein denoted "processing blocks," represent computer software instructions or groups of instructions. The diamond shaped elements (typified by element 148 in FIG. 10A), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It Processing then proceeds to step 158 where each file system extent is mapped to the physical device. This step takes each of the extents and determines where the extents actually exist on the physical devices (this is done for each of the file extents one at a time). That is, the third step is to determine where the extents found by the file system (or as the file system views them) actually exist on the physical device.

Step 159 implements a loop in which steps 157–158 are repeated until all file extents have been processed. Thus, the mapping process if the file is on a physical device comprises performing a loop of the file extent blocks and for each of the blocks generating a file mapping extent block in which the device is the physical device and the offset and length are the same as the files.

Figure 11A:
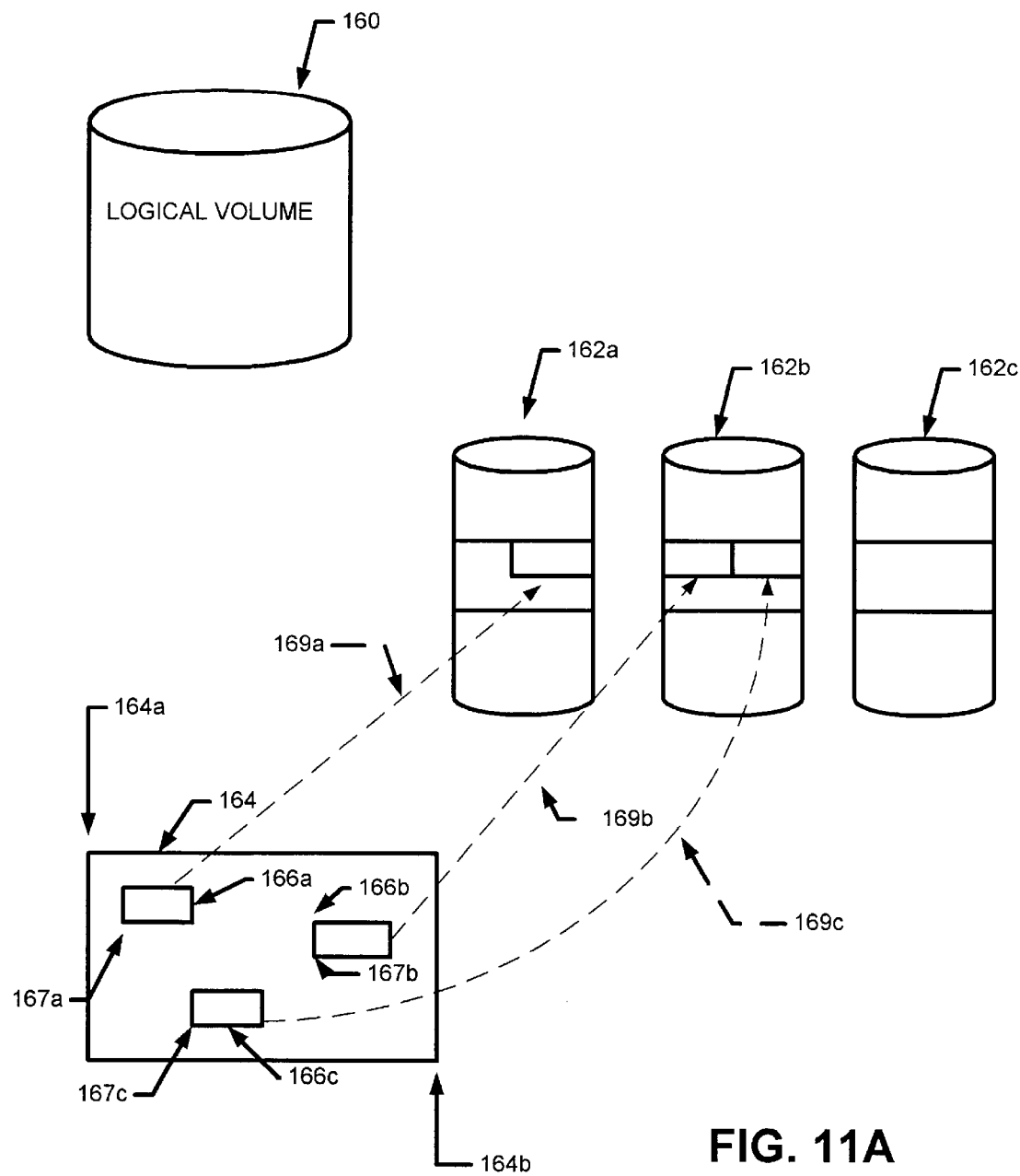
FIG. 11A is a diagrammatical view of file mapping from a logical volume to physical device.

An example of the process described in FIG. 11 is now explained in conjunction with FIG. 11A.

Figure 2:
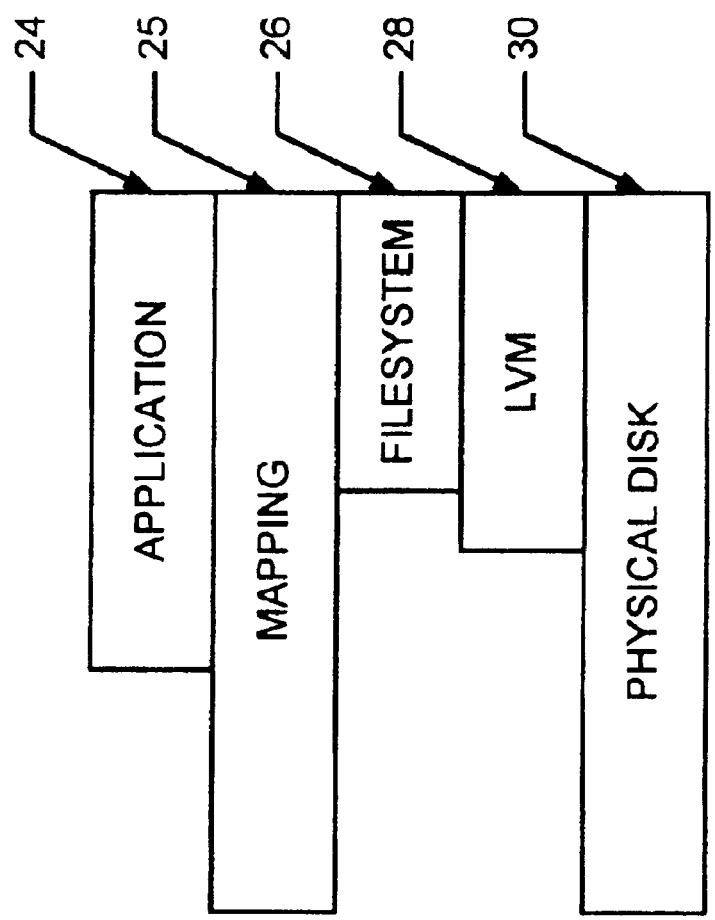
FIG. 2 is a diagrammatical representation of the software layer communication abilities.

Referring now to FIG. 11A, as indicated in FIG. 2, when mapping the logical volume to the physical volume, the volume manager 28 (FIG. 2) exposes to the file system 26 (FIG. 2) a logical volume 160 which appears to the file system as a large disk 160. The logical volume 160, however, is actually composed of pieces of many physical disks 162a–162c referred to as hyper-volumes 162a–162c. The logical volume 160 is thus made up of a combination of hyper-volumes, starting offset and ending offset or length.

Thus, the result of step 156 in FIG. 11 is to provide this first piece of information (i.e. the hyper-volumes, starting offset and ending offset or length which make up the file on the logical volume 160).

Still referring to FIG. 11A, as described above in conjunction with FIG. 3, the file system views itself as having some "pane" of storage space 164. That is, the file system views itself as a flat space having a beginning offset 164a of zero and an ending offset 164b of some number corresponding to the size of the space. For example if the storage space were 10 Mb then the ending offset value would be 10,485, 760. In the file system view, the file is made up of one or more file extents. In the example of FIG. 11A, the file is made up of three file extents 166a, 166b, 166c. Each of the file extents 166a–166c has a corresponding file extent offset 167a–167c value. Thus, the second piece of information which is provided as a result of step 157 (FIG. 11) are the file extent offset values (represented by reference numbers 167a–167c in FIG. 11A).

As indicated by reference lines 169a–169c in FIG. 11A, the file extents map to particular regions of the hyper-volumes 162a–162c. Thus, the third piece of information is the information from mapping the file system view to the physical device (step 158 in FIG. 11).

The extent block required to represent the file information could have the form described above in conjunction with FIG. 8. It should be understood that the example of FIG. 11 A does not include holes.

FIG. 12 describes the processing associated with mapping a concatenated LVM (see FIG. 6). A concatenated LVM condition occurs when there is more than one physical extent making up the logical volume and data is laid out sequentially (i.e. first fill up the first extent, then the second and then the third). The file system level (e.g. level 26 in FIG. 2) is not aware of and doesn't have access to this information.

Referring now to FIG. 12, processing begins in step 170 in which a file extent is selected. Next, an offset in the file extent is determined as shown in step 172. Processing then proceeds to step 174 in which the offset in the file extent is mapped to a physical device.

The process then proceeds to steps 176 and 178 in which the amount of the file extent which fits on a physical device is computed and then that amount is mapped. The amount of the file extent which fits on a physical device is denoted "x" hereinbelow.

The process then proceeds to step 180 in which the offset in the file extent is incremented by the amount "x" from the file extent which was mapped in step 178. Decision block 182 then implements a loop in which steps 172 through 180 are repeated until the end of the file extent is reached. Once the end of the file extent is reached, decision block 184 implements a loop in which steps 174 through 182 are repeated until the all of the file extents have been processed. Once all of the file extents have been processed, processing ends.

Figure 13:
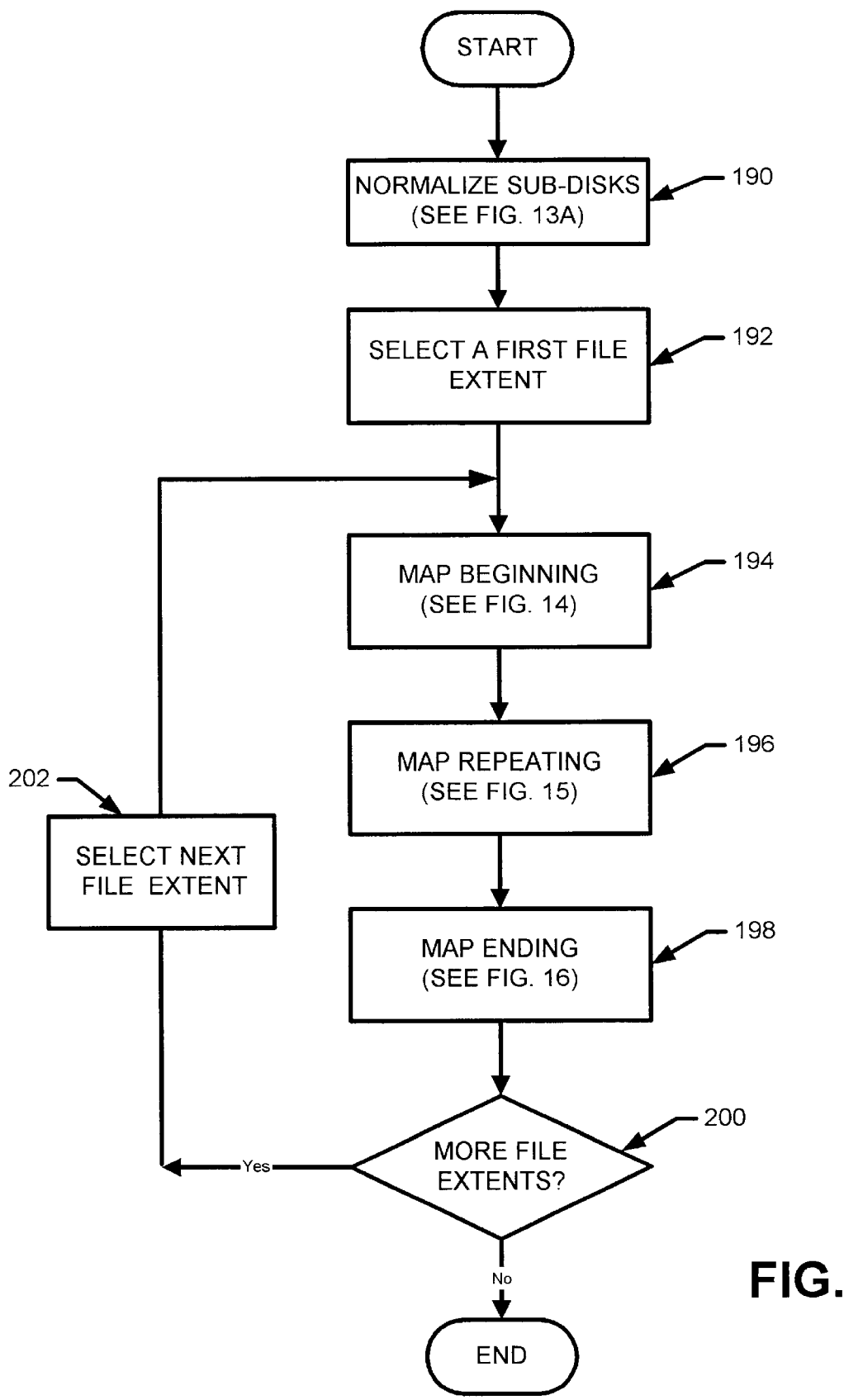
FIG. 13 is a flow diagram which illustrating a method for mapping a file on striped logical volumes.

Referring now to FIG. 13, the technique for mapping data in a striped LVM is shown. Processing begins with the normalization of sub-disks as shown in step 190. The details of the disk normalization process will be described below in conjunction with FIGS. 13A–13C. Suffice it here to say, however, that step 190 produces columns having equal sized sets of subdisks wherein each set of subdisks is the largest in which a repeating group can be found.

Processing then proceeds to steps 192 and 194 where a first file extent is selected and the beginning of the file is mapped. The procedure for mapping the beginning of a file is described below in conjunction with FIG. 14.

Processing next proceeds to steps 196 and 198 in which the all of the repeating blocks are mapped as is the end of the file extent. The details of these steps are described below in conjunction with FIGS. 15 and 16 respectively.

Decision block 200 implements a loop in which a loop in which steps 194 through 198 are repeated until the all of the file extent have been processed. Once all of the file extents have been processed, processing ends.

An example of the subdisk normalization process is next described in conjunction with FIGS. 13A–13C below.

Before proceeding with a description of the subdisk example, however, it should be appreciated that the process described in steps 192–200 of FIG. 11 could still be performed but the process would become more complicated to implement if each of the columns did not have the same sized disks (the complication would be due, at least in part, to the need to track different physical device offsets which would occur if the disks are not normalized). Thus, the goal of the normalization process is to make each of the columns have the same size disks (i.e. have each column made up of an equivalent sized list of subdisks) in an effort to increase the number of repeat blocks which can be used. This equivalent list is needed because repeating groups can only be mapped while no column crosses a subdisk (i.e. while no column changes hyper-volume). It should be understood, however, that the technique of the present invention still provides advantages even if the sub-disks are not normalized.

In general overview, the normalization process is as follows. First it is necessary to obtain a list of subdisks that make up the columns of the LVM. Then, the list of subdisks are read and individual lists are created for each column.

Next the size of each subdisk in each column is obtained and the size of the smallest subdisks is found. For each column, if the smallest size is the same size as the current subdisk then the next subdisk in the column is checked. Whenever the subdisk size is greater than the then current smallest size, split the subdisk into one the size of the smallest and one that is the remainder. This process is repeated until each of the columns have the same size subdisks.

It should be appreciated that what is generated through this process is a list of normalized subdisks that is equal to the size of the logical volume divided by the number of columns. This is because the subdisks that make up the columns may contain more data than the user has allocated to the LVM. This prevent mapping information that could not contain valid information.

For striped LVMS, if the columns have ragged bottoms (i.e. all columns are not the same length), then only the minimum length of all columns is mapped. Since no valid data can be stored in the ragged portion of the column, only the area where real data could be stored is mapped.

FIG. 13A shows a plurality of columns 202a–206a prior to normalization. It should be understood that the columns 202–206 correspond to a logical representation in a striped LVM. Thus, the columns 202–206 are a logical concept which correspond to some physical reality (i.e. by some physical disks).

In this particular example, three columns 202, 204, 206 to be normalized are shown. Those of ordinary skill in the art recognize of course that practical systems can include more than three columns (and in some cases significantly more than three columns) and it should be appreciated that the normalization technique of the present invention is effective regardless of the number of columns being normalized.

Assuming each of the columns 202, 204, 206 are of length 100, then column 202 is made up of two physical devices 202a having a length 30 and 202b having length 70. Thus, the two physical devices 202a, 202b make up the column 202 having length 100. It should be noted that a segment 203 spans a pair of subdisks 202a, 202b.

Similarly, column 204 is made up of a single physical device 202a having a length 100 and column 206 is made up of a first physical device 206a having a length 50 and a second physical device 206b having a length 70. Since the total length of physical devices 206a, 206b is greater than 100, then column 206 has a so-called "ragged edge" 207 meaning that a physical device exists for that space their but the space cannot be used. In the example of FIG. 13A, the ragged edge is of length 20. Thus disk 206b has a useable length of 50 and an unusable length of 20.

In FIG. 13A, the columns 202, 204, 206 are each examined to determined the smallest subdisk which exists. In this case subdisk 202a having the length of 30 is the smallest subdisk in any of the columns 202–206. After the smallest subdisk is found, a subdisk of that size is generated in each of columns 204, 206. The new columns are shown in FIG. 13B and are designated 202', 204', 206'. It should be noted that each column 202'–206' now includes a subdisk equal in length to the size of subdisk 202a (which had previously been identified as the smallest subdisk).

Referring now to FIG. 13B, the newly generated columns 202', 204', 206' are each examined to again determine the smallest subdisk which exists among those columns. In this step, subdisk 206b' is identified as the smallest subdisk in columns 220'–206'. Thus, a subdisk the size of subdisk 206b' is generated in each of columns 202', 204', 206'. This results in each of the columns having the appearance of columns 202"–206" shown in FIG. 13C.

Referring now to FIG. 13C, the columns 202", 204", 206" are shown. As can be seen in FIG. 13C, all subdisks in the columns 20"–206" are now of the same size and the normalization process is thus complete. Thus, after the normalization process, each of the normalized columns 202", 204", 206" is provided having three subdisks. A first one of the subdisks 202a", 204a" and 206a" has a length 30, a second one of the subdisks 202b", 204b" and 206b" has a length 10 and a third one of the subdisks 202c", 204c" and 206c" has a length 60.

Figure 14:
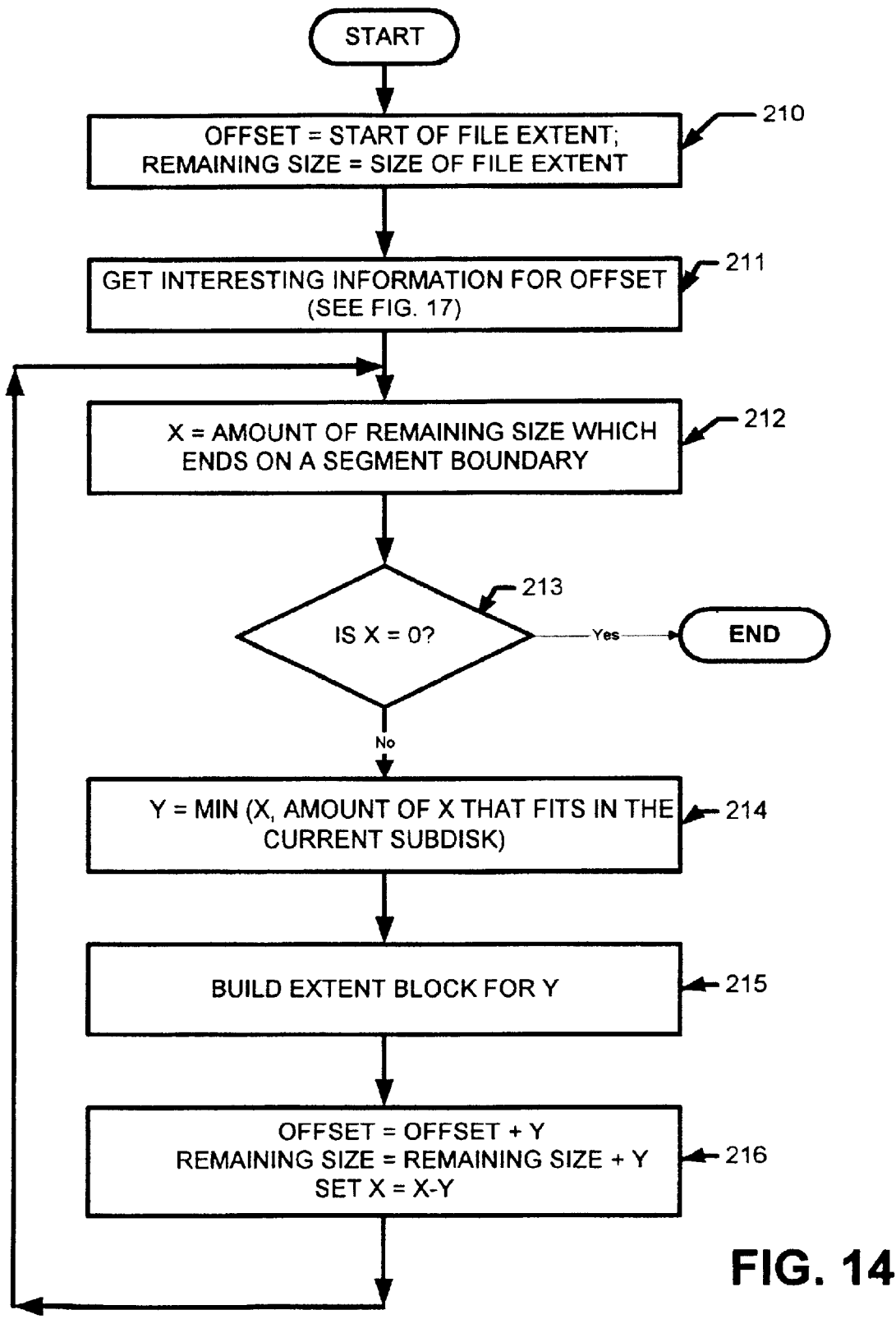
FIG. 14 is a flow diagram illustrating a method for mapping the beginning of a file.

Referring now to FIG. 14, a technique for mapping the beginning of the extent is shown. The process begins in step 210 by setting an "offset" value equal to the start of the file extent and setting a "remaining size" value equal to the size of the file extent. It should be understood that here that the offset refers to the offset within the segment.

Processing then proceeds to step 211 where "interesting information" is obtained for the offset. In the context of a striped LVM, the "interesting information" being referred to is: (1) the subdisk, (2) the offset on the subdisk, (3) the hyper-volume, (4) the offset on the hyper-volume, (5) the offset in the LVM segment and (6) the minimum amount that can be mapped. One technique for obtaining the interesting information is described below in conjunction with FIG. 17.

Once the interesting information is obtained, processing flows to step 212 in which a value "x" is set equal to the amount of the remaining size which ends on a segment boundary.

Next in decision block 213 it is determined whether there is any amount of the remaining size which ends on a segment boundary (i.e. is what is left zero?). If nothing is left (i.e. x=0) then processing ends. If on the other hand, something is left (i.e. x is not equal to 0) then processing proceeds to step 214 where a value "y" is set equal to the less of x and the amount of x which fits on the current subdisk.

Processing then continues with step 215 where an extent block is built for y. Next as shown in step 216, a new offset value is computed as the current offset value plus y, a new remaining size value is computed as the current remaining size value plus y and a new value for x is computed as current value for x less the current value of y. Each time a new offset value is generated, it is necessary to obtain the interesting information for that offset and to map with the new offset. Processing then returns to step 212. Steps 212 through 216 are repeated until the value of x equals 0. Thus steps 212–216 implement a repetitive process in which either the total size of the extent is mapped or whatever will fit into the region available is mapped and this process continues until nothing remains to be mapped.

It is important to note that every time a new offset occurs, it is necessary to get the interesting information for that offset and it is also necessary to make sure that mapping is done only within a subdisk.

Referring now to FIG. 14A, an example of the map beginning process is illustrated. This example assumes a well-behaved logical volume. In this example, three columns 218a, 218b, 218c each having the same length are shown. In this particular example, the width is assumed to be 128K and the length is assumed to be 1280K. Thus there are ten segments in each column 218a–218c.

Each of the columns 218a–218c therefore holds ten LVM segments so there are thirty LVM segments $219_1$–$219_{30}$ between the three columns 218a–218c shown on FIG. 14A. Data is thus "striped" across each column in order from segment $219_1$–$219_{30}$.

Assuming a file extent begins at a file extent offset 221 and that the offset here corresponds to 56K. This means that the file extent will reach the segment boundary after a length of 72K.

To make the technique of the present invention simpler to the implementer, it is desirable to map repeating portions that begin on a segment boundary. This is because segment boundaries are physically on one disk and we would like to stay on one physical disk while mapping the file extents. Thus, during the map beginning process, the mapping is performed to reach a segment boundary.

The above example becomes more complicated in the case where the extent did not all fit on a single subdisk. That is, it is possible to have subdisks as shown in FIG. 14B.

In FIG. 14B, three subdisks 223, 224, 225 are again shown. Rather than having widths of 128K, however, the subdisks 223, 224, 225 have widths of 56K, 32K and 40K respectively. Assume that it was desired to map the file extent discussed in FIG. 14A onto the three subdisks shown in FIG. 14B. The stripe width is still 128K because the LVM has specified a 128K stripe width even though the physical disks are smaller than 128K. Since the extent has a file extent offset of 56K, then to map this file extent, it will be necessary to generate two extent blocks one for the 32K subdisk 224 and one for the 40K subdisk 225 (because each of the subdisks are independent physical pieces of storage). This example illustrates why it is necessary to compute the offset and length of the file extent in the map beginning process.

Figure 15:
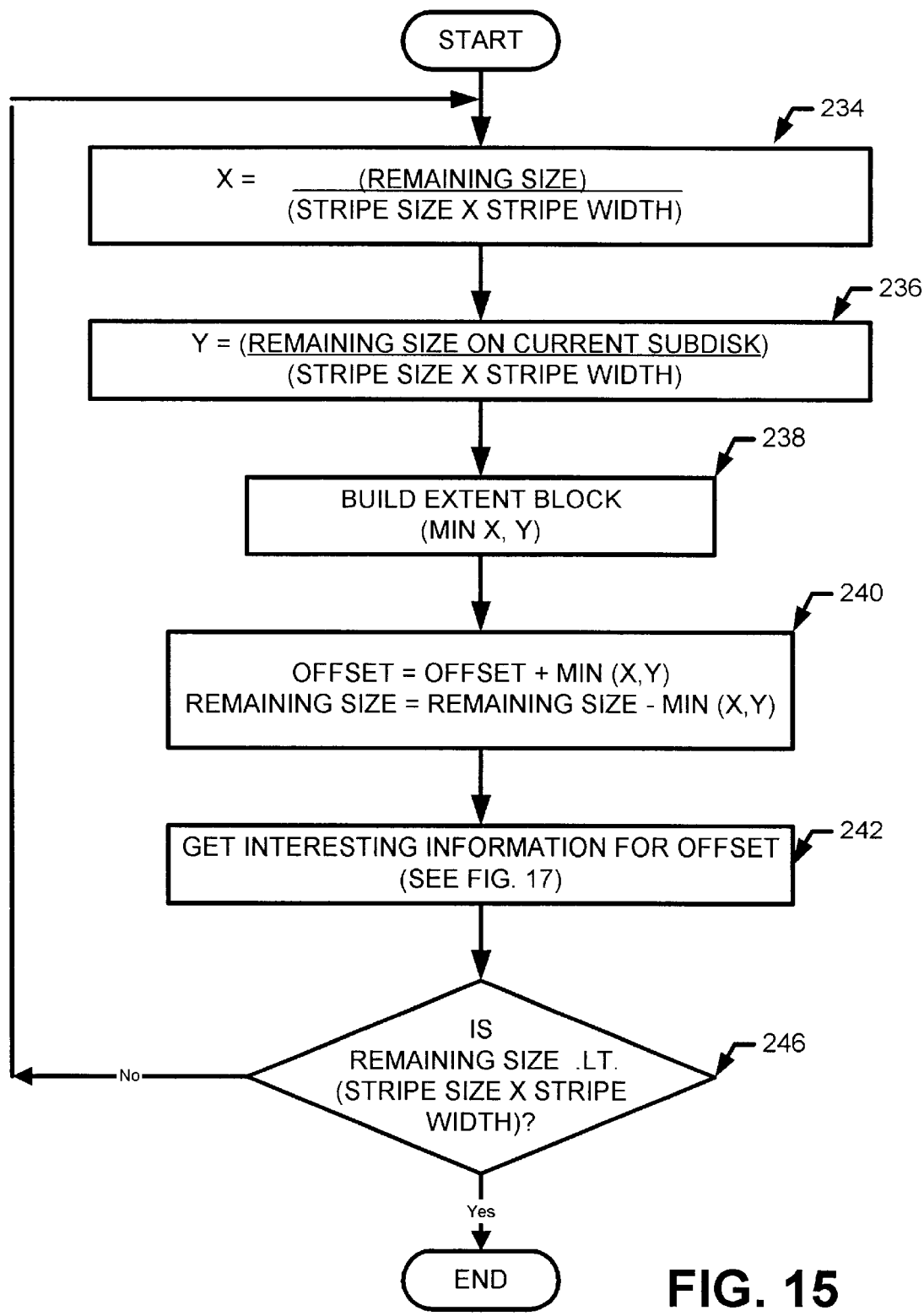
FIG. 15 is a flow diagram illustrating a method to map repeating blocks.

Referring now to FIG. 15, a technique to map repeating blocks is shown. It should be appreciated that this technique is done for each file extent and that the values retrieved or computed during the map beginning process are used in the map repeating process. The procedure used in the flow diagram of FIG. 15 is used to determine the number of repeats which can be used.

Processing begins in step 234 where the value "x" is computed as the remaining size divided by the product of the stripe size and the stripe width. That is, process step 234 computes the number of repeats which can be mapped to the remaining size. Using the example described above in conjunction with FIG. 14, the stripe width is three and the stripe size is 128K. In the case where the stripe width is three and the stripe size is 128K, the question is how many extents (in this case each being 384K) fit in the remaining size of the subdisk.

Processing then proceeds to step 236 where it is determined how many repeats can be mapped on the current subdisk (i.e. how much will fit on the current subdisk). The value "y" is computed as the remaining size on the current subdisk divided by the product of the stripe size and the stripe width.

Processing then proceeds to step 238 where an extent block is built for the smaller of the x and y values. Thus, the minimum amount is mapped.

Processing then proceeds to step 240 where a new offset value is computed as the sum of the current offset value and the smaller of the values of x and y. Also, a new remaining size value is computed as the difference between the current remaining size values and the smaller of the values of x and y. Thus step 240 adjusts the offset and remaining size values by the amount mapped in step 238.

Figure 16:
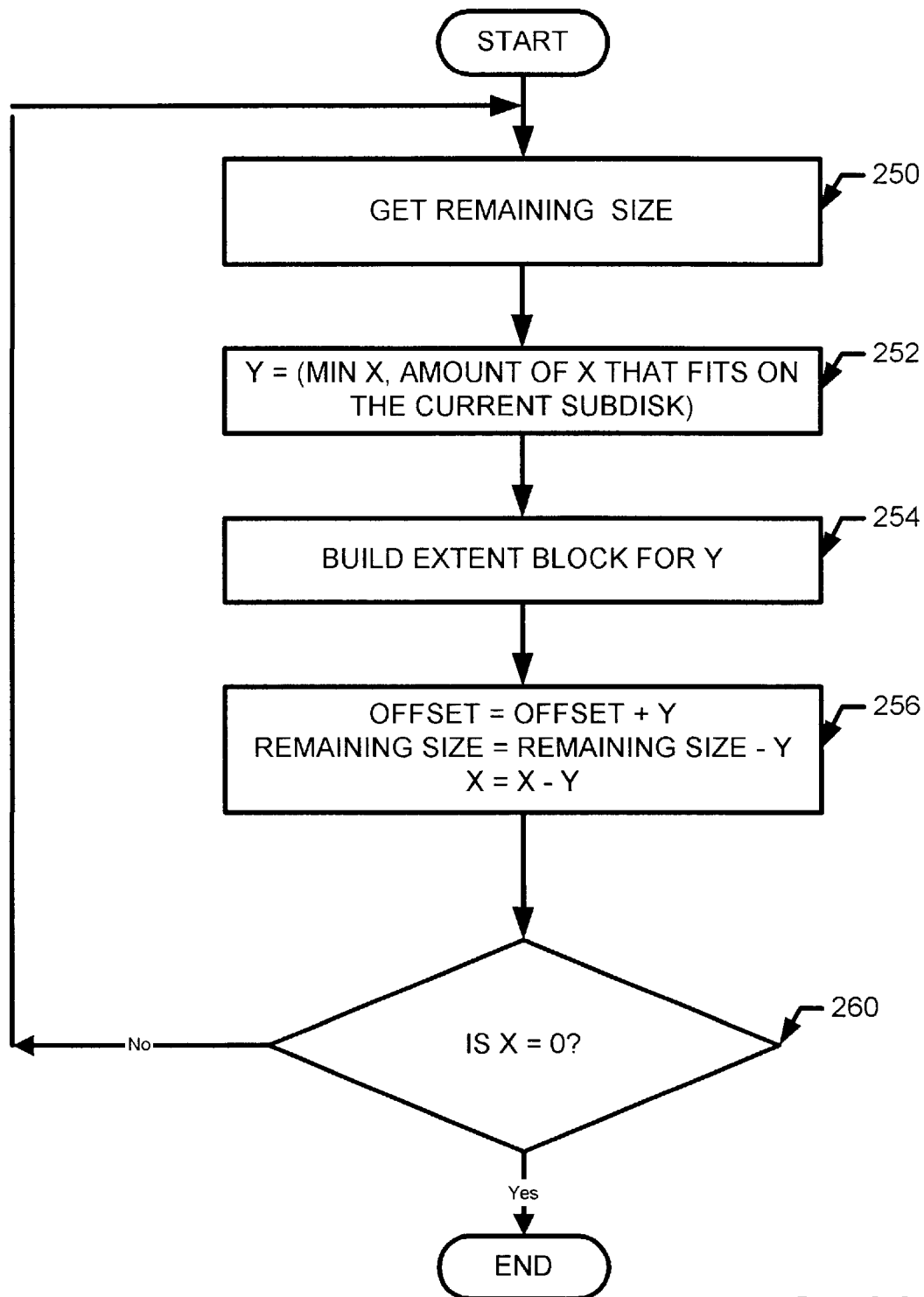
FIG. 16 is a flow diagram illustrating a method to map ending blocks.

Next, as shown in step 242, the interesting information for the new offset value is obtained. A technique for computing the interesting information is described below in conjunction with FIG. 17. As shown in decision block 246, if the remaining size is less than the product of the stripe size and the stripe width (i.e. if there is not enough room to build another extent) then processing ends (i.e. if what is left is less than what could potentially make one repeat then processing is complete) and the remaining portion will be mapped using the map ending process (FIG. 16). Otherwise processing returns to step 234 and steps 234–246 are repeated until the remaining size is less than the product of the stripe size and the stripe width. That is, the system will attempt to map more because there are more repeats we could probably be processed on other subdisks.

Referring now to FIG. 16, a technique to map ending blocks is shown. It should be appreciated that the map ending process also uses the offset and remaining size values computed during the map beginning process described above in conjunction with FIG. 14. The map ending technique is used when what is remaining of an extent should still be mapped but is less than what can be mapped in a stripe width.

Processing begins in step 250 where the remaining size is obtained. Processing then proceeds to steps 252 where a value "y" is set equal to a value which is the lesser of x and the amount of x which fits on the current subdisk.

Processing then continues with step 254 where an extent block is built for y. Next as shown in step 256, all of the sizes are re-computed. In particular, a new offset value is computed as the sum of the current offset value and the value of y, a new remaining size value is computed as the sum of the current remaining size value and the value of y and a new value for x is computed as current value for x less the current value of y. It should again be noted that each time a new offset value is generated, it is necessary to obtain the interesting information for that offset.

Next in decision block 260 it is determined whether there is any amount of the remaining size which ends on a segment boundary (i.e. is what is left zero?). If nothing is left (i.e. x=0) then processing ends. If on the other hand, something is left (i.e. x is not equal to 0) then processing returns to step 250 and steps 250–258 are repeated until x=0.

The difference between the map beginning and the map ending methods is that the value for x is computed differently. In the map beginning process, x corresponds to the remaining size divided by the product of the stripe size and stripe width while in the map ending process, x is just the amount remaining.

Figure 17:
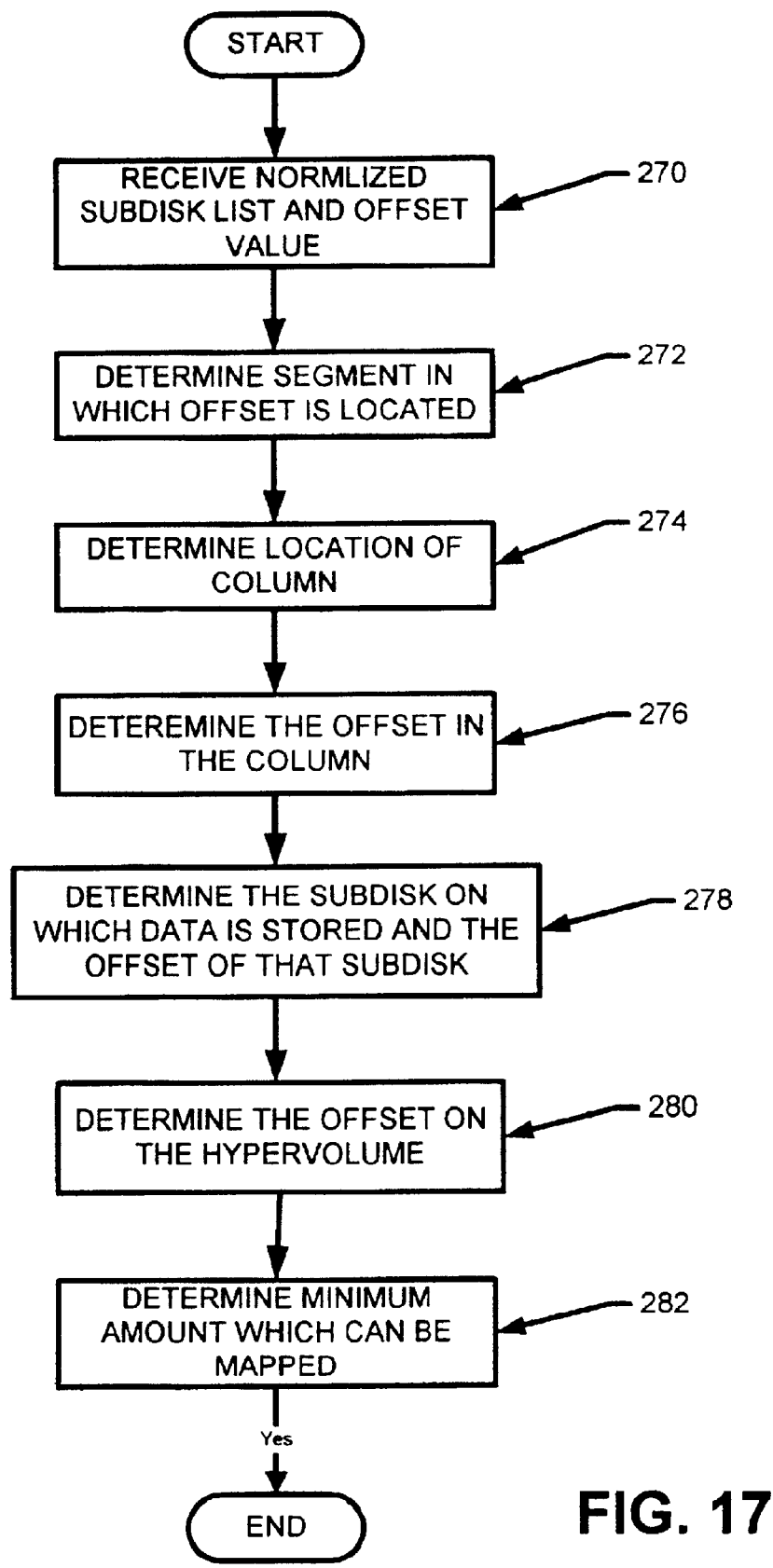
FIG. 17 is a flow diagram illustrating a method to compute interesting information of an offset file stored striped LVM.

Referring now to FIG. 17, a process for computing the "interesting information" defined above in FIG. 14 is described. It should be appreciated that given a normalized subdisk array, the interesting information referenced above in FIGS. 11–16 can be obtained for any offset.

As mentioned above in conjunction with FIG. 14, the interesting information for any logical offset in an LVM is: (1) the subdisk, (2) the offset on the subdisk, (3) the hyper-volume, (4) the offset on the hyper-volume, (5) the offset in the LVM segment and (6) the minimum amount that can be mapped.

By knowing the subdisk, one can determine what hyper-volume on which the logical offset exists. By knowing the offset on the subdisk, one can determine what the offset is in the hyper-volume. It is desirable to know the offset in the LVM segment because it is important to know when the end of that segment is reached. Also, it is important to know the minimum amount that can be mapped (i.e. the smallest amount that can be mapped to a segment)—so that the case where the segment is bigger than the subdisk size can be processed (e.g. even though it is desirable to map to the end of a segment, it may not be possible because the segment takes up multiple subdisks).

After the subdisks are normalized, for the remainder of the process shown and described in conjunction with FIG. 13 it would be desirable to have certain information available. For example, whenever it is desired to compute an offset in an extent, it is always desirable to obtain the interesting information.

Recall that in the processing of a concatenated volume, all the information that was needed for processing was the physical device, the hypervolume its offset and length. In the LVM case, it is desirable to obtain the interesting information. Thus, FIG. 17 shows a technique which can be used in obtaining this "interesting information" for use in the process of FIG. 13.

The process described in FIG. 17 takes two pieces of input: (1) normalized subdisk lists and an offset and returns all of the interesting information.

Turning now to FIG. 17, processing begins in step 270 in which a list of normalized subdisks and an offset value are provided as inputs to a processor for computing the interesting information. The stripe size and the number of stripes are known.

Next processing proceeds to step 272 in which the segment in which the offset is located is found. This is computed as segment=offset/stripe size.

Once the segment is located, then processing proceeds to step 274 in which the location of the column in which the segments reside is found. The column location is found taking segment value mod the number of stripes.

Also once the segment is known, the offset in the segment and the offset in the column can be determined as shown in steps 272, 274. The offset in the segment can be computed as the offset value mod the stripe size while the offset in the column can be computed as follows:

Offset in column=(stripe size*segment/number of stripes)+offset in the segment.

Once the column is identified, the subdisks of this column on which the data is stored are found as is the offset of that subdisk as shown in step 278. Once the subdisk and subdisk offset are identified, the offset on the corresponding hyper-volume is found as shown in step 280.

Next, in step 282, the minimum amount which can be mapped is found and processing then ends. Thus FIG. 17 provides a the technique to find the interesting information required by the process shown in FIG. 13 while needing only a list of normalized disks and an offset size for inputs.

Figure 17A:
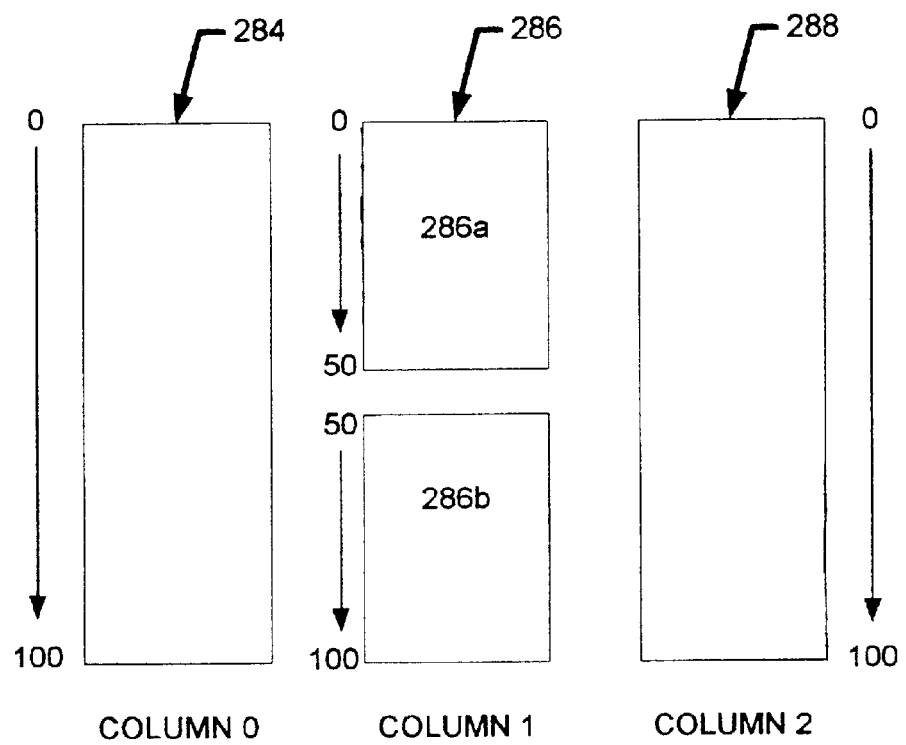
FIG. 17A is a block diagram illustrating a method to compute interesting information of an offset in a file stored as a striped LVM.

Referring now to FIG. 17A, an example is provided in which the technique of FIG. 17 is applied to an LVM system having three columns (stripes) 284, 286, 288, a stripe width of ten, a column length of one-hundred (three-hundred total size) and in which the first and third columns 284, 288 are on one subdisk and the second column 286 includes two subdisks 286a, 286b.

Turning now to FIG. 17A, an LVM system has three columns 284, 286, 288 identified as "column 0", "column 1" and "column 2." In this example, each column is 100 bytes long and the stripe width is 10 bytes. Assume it is desired to obtain interesting information for an offset (i.e. a logical offset) of 222. Then, as shown in step 272 (FIG. 17) the segment is computed as offset DIVIDED BY stripe size. Here the stripe size is 10 so the segment is 22 (computed as 222 DIVIDED BY 10). Next, the column in which the offset resides is determined by taking the mathematical mod (MOD) of the segment and the number of stripes. Thus, in this example the offset appears in "column 1" (computed as 22 MOD 3) denoted with reference character 286 in FIG. 17.

Next, the offset in the segment is determined by taking the MOD of the offset and the stripe size. Thus, in this example, offset in the segment is 2 (computed as 222 MOD 10).

The offset in the column can be computed as discussed above in conjunction with step 276 and in this example offset in the column is 72 (computed as 10*(22/3))+2). Since column 286 is made up of two subdisks 286a, 286b and each subdisk is 50 bytes long then a column offset of 72 must appear in the second subdisk (since 72 is larger than the length of the first subdisk). The offset on the subdisk is then computed as 72–50 (i.e. the offset in the column minus the offset of the second subdisk). Thus, assuming that the first column is provided from two subdisks, the offset on the second subdisk would be 22.

The offset on the hypervolume is then computed as the sum of the offset on the subdisk and the subdisk offset (see step 280 FIG. 17) and the minimum amount which can be mapped is also computed (see step 282 FIG. 17).

Thus whenever it is desired to map an offset to something physical, the process of FIG. 17 can be used to provide the interesting information which allows the mapping to be done.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method of backing up data in a system comprising a primary processor, a shared storage device and a backup storage device, the method comprising:
   performing a discovery process which includes identifying files to be backed up;
   determining a file type for each of the identified files;
   in response to a file corresponding to a physical file type, performing physical storage processing;
   in response to a file corresponding to a concatenated file type, performing concatenated storage processing; and
   in response to a file corresponding to a striped file type, performing striped storage processing.

2. The method of claim 1 further comprising:
   performing a backup preparation phase process to place the shared storage device into a state permitting backup to be performed; and
   backing up files identified in the discovery process including copying hyper-volumes from the shared storage device over a direct connection to the backup storage device; and
   restoring the shared storage device to an operational condition.

3. The method of claim 1 wherein performing physical storage processing comprises the unordered steps of:
   (a) mapping a logical volume to a physical device;
   (b) mapping the file to its file extents;
   (c) checking for holes in each file extent used in mapping the file to its file extents;
   (d) mapping each file system extent to the physical device; and
   (e) repeating steps (c) and (d) until all file extents have been processed.

4. The method of claim 1 wherein performing concatenated storage processing comprises the unordered steps of:
   (a) selecting a file extent;
   (b) determining an offset in the file extent;
   (c) mapping an offset in the file extent to a physical device;
   (d) mapping the amount of the file extent which fits on a physical device;
   (e) incrementing the offset in the file extent by the amount of the file extent which was mapped in step (d);
   (f) repeating steps (c)–(e) until the end of the file extent is reached.

5. The method of claim 4 further comprising the unordered steps of:
   (g) selecting a next file extent; and
   (h) repeating steps (c) through (g) until all of the file extents have been processed.

6. The method of claim 1 wherein performing striped storage processing comprises the unordered steps of:
   (a) normalizing each subdisk on which the data to be backed up is stored;
   (b) selecting a first file extent in one of the subdisks; and
   (c) mapping beginning, repeating and ending portions of the first file extent to provide one or more extent blocks each of which define a logical volume, an offset value and a length and one or more repetition blocks each of which define a number of extent blocks and a number of repetitions required to define data to be backed-up.

7. The method of claim 6 further comprising performing a physical backup of a segment of storage stored on the shared storage device onto the backup storage device utilizing at least one of the one or more repetition blocks and at least one of the one or more extent blocks.

8. The method of claim 7 wherein the step of performing a physical backup comprises the step of physically backing up the segment of storage over a direct connection between the shared storage device and the backup storage device.

9. An apparatus for backing up data in a system comprising a primary processor, a shared storage device and a backup storage device, the apparatus comprising:

means for performing a discovery process which includes identifying files that are required to be backed up; and
 means for determining a file type for each of the identified files wherein:
  in response to the file corresponding to a physical file type, said means performs physical storage processing;
  in response to the file corresponding to a concatenated file type, said means performs concatenated storage processing; and
  in response to the file corresponding to a striped file type, said means performs striped storage processing.

10. The apparatus of claim 9 further comprising:

means for performing a backup preparation phase process to place the shared storage device into a state permitting backup to be performed;
 means for backing up the files identified in the discovery process; and
 means for restoring the shared storage device to an operational condition.

11. The apparatus of claim 10 further comprising a direct connection between the shared storage device and the backup storage device and wherein said means for backing up the files identified in the discovery process includes means for copying hyper-volumes from the shared storage device over the direct connection to the backup storage device.

12. The apparatus of claim 10 wherein said means for performing striped storage processing comprises:

means for normalizing each subdisk on which the data to be backed up is stored;
 means for selecting a first file extent in one of the subdisks; and
 means for mapping beginning, repeating and ending portions of the first file extent to provide one or more extent blocks each of which defines a logical volume, an offset value and a length and one or more repetition blocks each of which define a number of extent blocks and a number of repetitions required to define data to be backed-up.

13. A method for computing interesting information for any logical offset in an LVM comprising the unordered steps of:

(a) receiving a list of normalized subdisks;
 (b) receiving an offset value of a file extent;
 (c) determining the segment in which the offset value is located;
 (d) determining the location of the column in which the segment determined in step (c) resides;
 (e) determining, in the segment determined in step (c), a segment offset value corresponding to the offset value of the file extent;
 (f) determining, in the column determined in step (d), a column offset value corresponding to the offset value of the file extent;
 (g) determining the subdisks of the column found in step (d) on which the data is stored;
 (h) determining, in the subdisks found in step (g), a subdisk offset value corresponding to the offset value of the file extent;
 (i) determining, on a hypervolume, a hypervolume offset corresponding to the offset value of the file extent; and
 (j) determining the minimum amount which can be mapped.

14. The method of claim 13 wherein:

determining the segment in which the offset value is located includes computing the segment as the offset divided by the stripe size;
 determining the location of the column includes taking the mathematical MOD of the segment value and the number of stripes;
 determining the segment offset value includes taking the mathematical MOD of the offset value and the stripe size; and
 determining the column offset value includes computing the offset in the column as (stripe size*segment/number of stripes)+offset in the segment.

* * * * *

UNITED STATES PATENT AND TRADEMARK OFFICE
CERTIFICATE OF CORRECTION

PATENT NO. : 6,760,823 B1
APPLICATION NO. : 10/411500
DATED : July 6, 2004
INVENTOR(S) : Neil F. Schutzman It is certified that error appears in the above-identified patent and that said Letters Patent is hereby corrected as shown below:

Column 2, lines 42-43 delete "entitled Logical Restore from a Physical Backup in Computer Storage System." and replace with --entitled "Logical Restore from a Physical Backup in a Computer Storage System."--.

Column 2, lines 44-45 delete "EMC Data Manager: Symmetrix Connect User Guide" and replace with --"EMC Data Manager: Symmetrix Connect User Guide,"--.

Column 3, line 27 delete "it may be".

Column 4, line 20 delete "to be back-up" and replace with --to be backed-up--.

Column 4, line 46 delete "which facilitate" and replace with --which facilitates--.

Column 5, line 19 delete "which illustrating" and replace with --which illustrates--.

Column 5, line 21 delete "which illustrating" and replace with --which illustrates--.

Column 5, line 28 delete "which illustrating" and replace with --which illustrates--.

Column 5, line 43 delete "stored striped" and replace with --stored as a striped--.

Column 6, line 22 delete "system and techniques" and replace with --system and technique--.

Column 6, line 37 delete "physical device there" and replace with --physical device, there--.

Column 6, line 48 delete "blocks is performed." and replace with --block is performed.--.

Column 7, line 22 delete "described in below" and replace with --described below--.

Column 7, line 29 delete "then divide" and replace with --then divided--.

Column 7, line 41 delete "in lvm segments. Each lvm" and replace with --in LVM segments. Each LVM--.

Column 7, line 42 delete "the lvm" and replace with --the LVM--.

Column 9, line 12 delete "Referring now to 2," and replace with --Referring now to Fig. 2,--.

Column 9, line 60 delete "Continued increase in demand" and replace with --Demand--.

Column 9, line 61 delete "continuously increases." and replace with --continuously increased.--.

Column 10, line 22 delete "form EMC Corporation," and replace with --from EMC Corporation,--.

Column 10, line 25 delete "FIG. 3 a" and replace with --FIG. 3, a--.

Column 10, line 50, delete "system view the" and replace with --system views the--.

Column 11, line 12 delete "is provided is from" and replace with --is provided from--.

Column 11, line 38 delete "Fig. 8 a" and replace with --FIG. 8, a--.

Column 12, line 15 delete "128K to compute" and replace with --128K. To compute--.

Column 12, line 40 delete "particular apparatus. It" and replace with --particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 10:
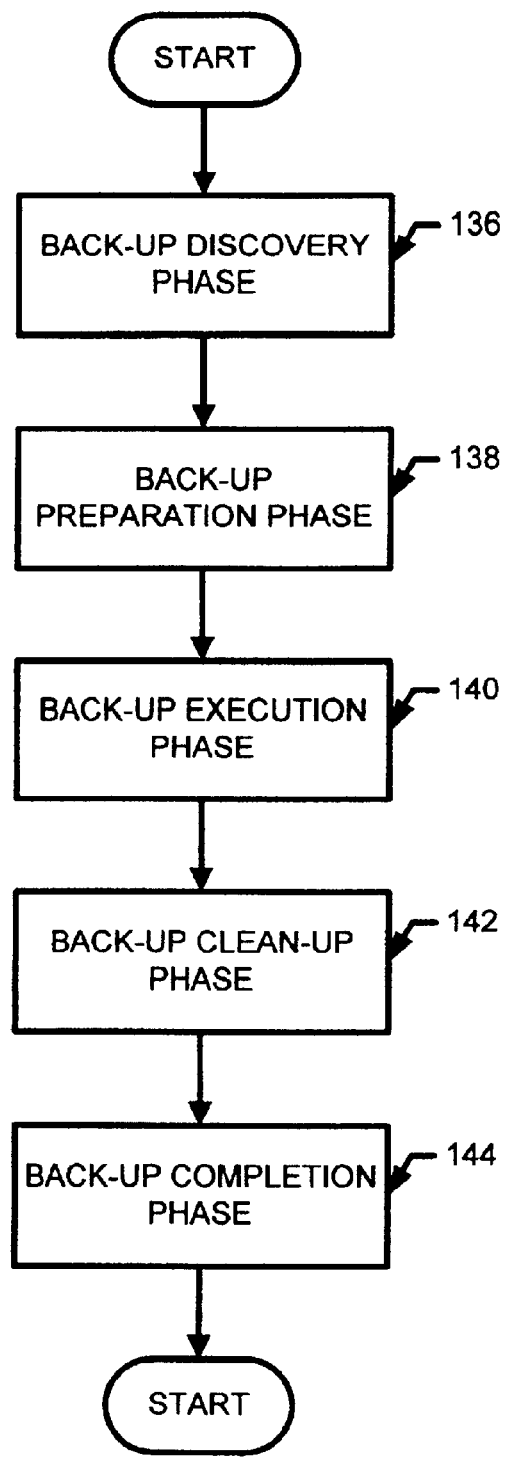
FIG. 10 illustrates one embodiment of a method for backing up data.

Turning now to Fig. 10, one embodiment of a method of performing a backup using the system illustrated in Fig. 1 and over the direct connection 22 is shown. The method begins at a step 136, where a discovery process is performed. In the discovery process, software identifies the physical storage segments (e.g., hyper-volumes, or portions of hyper-volumes) that are required to be backed up. The software that performs the discovery phase may be located on the client 12, the storage system 20 or on an independent controller (not shown). Alternatively, custom or semi-custom hardware may be used to perform some or all of these functions.

At a step 138, a backup preparation phase process is performed. This backup preparation phase places the storage system 16 into a state permitting backup to be performed.

At a step 140, a backup execution phase process is performed. In this step, the actual backup of the physical storage identified at step 136 is performed. The hyper-volumes are copied from storage system 16 (Fig. 1) over the direct connection 22 (Fig. 1) to the backup storage system 20 (Fig. 1). For example, hyper-volumes may be transferred from a Symmetrix storage system 16, over a SCSI cable 22, to an EDM unit 20. The EDM unit 20 may then control storing the backed up hyper-volumes onto a tape media.

At a step 142, a backup cleanup phase is performed. The cleanup phase restores the storage system 16 to its full operational condition.

At a step 144, the backup process is completed and any remaining network or backup monitoring is performed (such as reporting results and logging information in a log file).

CERTIFICATE OF CORRECTION (continued)
U.S. Pat. No. 6,760,823 B1

Figure 10A:
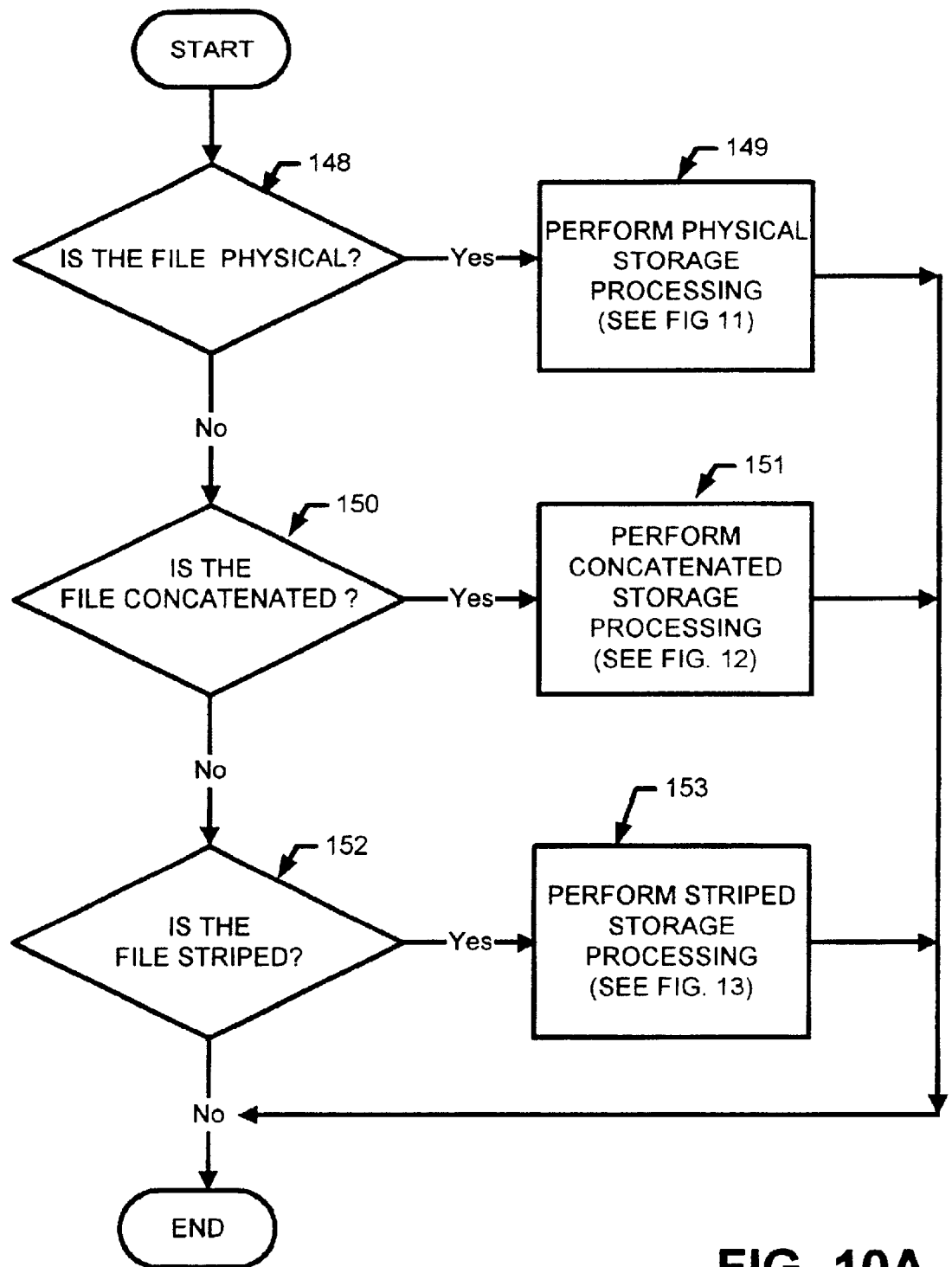
FIG. 10A is a flow diagram which illustrating a method for determining how to process a file.

Referring now to Fig. 10A, the process to determine the file type is shown. Once the file type is determined, processing proceeds on the basis of the file type as will be described in detail below. That is, Fig. 10A illustrates a branching which occurs based on the type of physical extent to be backed up. As shown in decision block 148, if it is determined that the file type is physical, then processing proceeds to step 149 where the steps to map physical storage are performed as will be described in conjunction with Fig. 11.

If the file type is concatenated, then processing proceeds to step 150 where the steps to map concatenated storage are performed as will be described below in conjunction with Fig. 12. Similarly, if the file type is striped, then processing proceeds to step 153 where the steps to map striped storage are performed as will be described below in conjunction with Fig. 13.

Turning now to Fig. 11, the process to map a file to be backed up which is stored on a physical device begins with step 155 in which the step of mapping a logical volume to a physical device is performed.

Next, the file is mapped to its extents as shown in step 156. Thus steps 155, 156, together provide two pieces of information (i.e. the mapping of the logical volume to the physical device and the mapping of the file to the extents).

Next, as shown in step 157, for each file system extent found in step 156, a check is made for holes in the file system extent.--.

Column 13, line 11 delete "10 Mb then the" and replace with --10 Mb, then the--.

Column 13, line 54 delete "until the all" and replace with --until all--.

Column 14, line 4 delete "the all of" and replace with --all of--.

Column 14, line 8 delete "the all of" and replace with --all of--.

Column 14, line 49 delete "This prevent" and replace with --This prevents--.

Column 15, line 16 delete "that space their but" and replace with --that space but--.

Column 15, line 40 delete "20' - 206'" and replace with --202' - 206'--.

Column 15, line 52 delete "that here that the" and replace with --that here the--.

Column 16, line 59 delete "extent blocks one" and replace with --extent blocks: one--.

Column 17, lines 44-45 delete "we could probably be" and replace with --that could probably be--.

CERTIFICATE OF CORRECTION (continued)
U.S. Pat. No. 6,760,823 B1

Column 17, line 55 delete "Steps 252" and replace with --Step 252--.

Column 18, line 38 delete "13 it would" and replace with --13, it would--.

Column 18, line 44 delete "the hypervolume its" and replace with --the hypervolume, its--.

Signed and Sealed this

Twenty-sixth Day of January, 2010

David J. Kappos
*Director of the United States Patent and Trademark Office*